(12) United States Patent
Threlkeld et al.

(10) Patent No.: US 12,182,114 B1
(45) Date of Patent: Dec. 31, 2024

(54) REQUEST COST INDEX FOR THROTTLING REQUESTS TO EXECUTE OPERATIONS IN A MULTI-TENANT PROVIDER NETWORK

(71) Applicant: Amazon Technologies, Inc., Seattle, WA (US)

(72) Inventors: Richard Threlkeld, Seattle, WA (US); Mehdi Ahmadizadeh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/703,743

(22) Filed: Mar. 24, 2022

(51) Int. Cl.
*G06F 16/242* (2019.01)

(52) U.S. Cl.
CPC ............................. *G06F 16/2448* (2019.01)

(58) Field of Classification Search
CPC .................................................. G06F 16/2448
See application file for complete search history.

(56) References Cited

U.S. PATENT DOCUMENTS

| | | |
|---|---|---|
| 6,438,618 B1 | 8/2002 | Lortz et al. |
| 7,421,492 B1 | 9/2008 | Malnati et al. |
| 9,219,736 B1 | 12/2015 | Lewis et al. |
| 10,089,142 B2 | 10/2018 | Plattner et al. |
| 10,656,966 B1 | 5/2020 | Grubin |
| 2004/0122892 A1 | 6/2004 | Brittenham et al. |
| 2005/0022188 A1* | 1/2005 | Tameshige ............ G06F 9/5055 718/100 |
| 2005/0192937 A1* | 9/2005 | Barsness ........... G06F 16/24532 |
| 2009/0282272 A1* | 11/2009 | Bestgen .................. G06F 16/22 713/320 |
| 2015/0039586 A1* | 2/2015 | Kerschbaum ..... G06F 16/24542 707/718 |

(Continued)

OTHER PUBLICATIONS

Doyle, Joseph. Load balancing and rate limiting based algorithms for improving cloud computing performance. Diss. Trinity College (Dublin, Ireland). School of Computer Science & Statistics, 2012. (Year: 2012).*

(Continued)

*Primary Examiner* — William Spieler
(74) *Attorney, Agent, or Firm* — Nicholson DeVos Webster & Elliott LLP

(57) ABSTRACT

Techniques for calculating and using a request cost index for throttling application programming interface (API) requests to execute operations in a provider network. The techniques encompass the step receiving a request to execute an operation at an API service in the provider network. Further steps include determining to execute the operation based on a request rate limiting algorithm, executing the operation to yield an operation result, and sending the operation result. Additional steps include calculating a request cost index that reflects an amount of computing resources utilized by executing the operation, determining an adjustment amount for a state variable of the request rate limiting algorithm based on the calculated request cost index, and adjusting (e.g., lowering) the state variable by the adjustment amount. Other (e.g., subsequent) requests to execute queries received at the API service that are metered by the state variable can be throttled by the API service.

20 Claims, 11 Drawing Sheets

(56) References Cited

U.S. PATENT DOCUMENTS

| | | | |
|---|---|---|---|
| 2015/0341300 A1 | 11/2015 | Swain et al. | |
| 2019/0361916 A1 | 11/2019 | Weaver et al. | |
| 2020/0004730 A1 | 1/2020 | Brown et al. | |
| 2020/0192706 A1* | 6/2020 | Huus | G06F 16/245 |
| 2020/0412760 A1* | 12/2020 | Luo | H04L 63/1458 |
| 2021/0306217 A1* | 9/2021 | Paiva | H04L 41/0893 |

OTHER PUBLICATIONS

How to construct an abstract syntax tree. (2018). Stack Overflow. Retrieved Apr. 29, 2023, from https://stackoverflow.com/questions/1721553/how-to-construct-an-abstract-syntax-tree (Year: 2018).*

Agthe, Donald E., and R. Bruce Billings. "Price rationing." Managing urban water supply. Dordrecht: Springer Netherlands, 2003. 23-43. (Year: 2003).*

Hardin, G. (1968). The tragedy of the commons. Science 162: 1243-1248. (Year: 1968).*

The GraphQL Foundation, GraphQL (Year: 2021).*

Aguilera et al., "Matching Events in a Content-based Subscription System", PODC '99: Proceedings of the Eighteenth Annual ACM Symposium on Principles of Distributed Computing, May 1999, pp. 53-61.

Bagchi, Saurabh, "Content-based Publish-Subscribe Middleware", Gryphon, Purdue Engineering, Jan. 26, 2003, 3 pages.

Fette et al., "The WebSocket Protocol", Internet Engineering Task Force (IETF), Request for Comments: 6455, Dec. 2011, 71 pages.

Github, "RFC: AppSync Enhanced Subscriptions Filtering #186", Available Online at <https://github.com/aws/aws-appsync-community/issues/186>, Nov. 8, 2021, pp. 1-26.

graphql.org, "GraphQL", Oct. 2021 Edition, Available Online at <https://spec.graphql.org/October2021/>, Oct. 2021, 174 pages.

Jacobsen, Hans-Arno, "Publish/Subscribe", Bell University Laboratory Chair in Software Engineering, Middleware Systems Research Group, University of Toronto, Available Online at <https://www.eecg.utoronto.ca/~jacobsen/courses/ece1770/slides/ps.pdf>, Mar. 2, 2007, 46 pages.

Kale et al., "Analysis and Algorithms for Content-based Event Matching", 25th IEEE International Conference on Distributed Computing Systems Workshops, Jun. 2005, 7 pages.

Non-Final Office Action, U.S. Appl. No. 17/697,777, Aug. 22, 2023, 12 pages.

Notice of Allowance, U.S. Appl. No. 17/697,777, Dec. 19, 2023, 7 pages.

Notice of Allowance, U.S. Appl. No. 17/850,962, Aug. 16, 2023, 12 pages.

* cited by examiner

REQUEST COST INDEX FOR THROTTLING REQUESTS TO EXECUTE OPERATIONS IN A MULTI-TENANT PROVIDER NETWORK

BACKGROUND

A provider network provides a user with the ability to use a computing-related resource such as a computing resource (e.g., executing a virtual machine (VM) instance or container, executing a batch job, executing code without provisioning a server), a data/storage resource (e.g., object storage, block-level storage, data archival storage, a database, a database table, etc.), a network-related resource (e.g., configuring a virtual network, a content delivery network (CDN), a Domain Name Service (DNS)), an application resource (e.g., a database, an application build or deployment service), an access policy or role, an identity policy or role, a machine image, a router or other data processing resource, etc. Use of a computing-related resource can be provided by the provider network as a service, such as a hardware virtualization service that can execute a compute instance, a storage service that can store a data object, etc. A user of the provider network can use a user account to access a service provided by the provider network. A user can interact with the provider network across an intermediate network (e.g., the internet) via an interface, such as through use of an application programming interface (API) call, via a console implemented as a website or an application, etc.

An API refers to an interface or communication protocol between a client computing device (e.g., a client computing device of a user) and a server computing device in the provider network, such that if the client computing device makes a request in a predefined format, the client computing device should receive a response in a specific format or initiate a defined action. In the provider network context, an API provides a gateway for the client computing device to access provider network infrastructure by allowing the client computing device to obtain data from or cause actions within the provider network, enabling the development of applications that interact with resources and services hosted in the cloud provider network. An API can also be a service of the provider network to exchange data with another service of the provider network.

The computing resource capacity of the provider network to process requests of an API is finite. To prevent the capacity from being reached, the provider network can limit (throttle) the rate at which requests of the API are processed.

BRIEF DESCRIPTION OF DRAWINGS

Various embodiments in accordance with the present disclosure will be described with reference to the drawings, in which.

DETAILED DESCRIPTION

Figure 1:
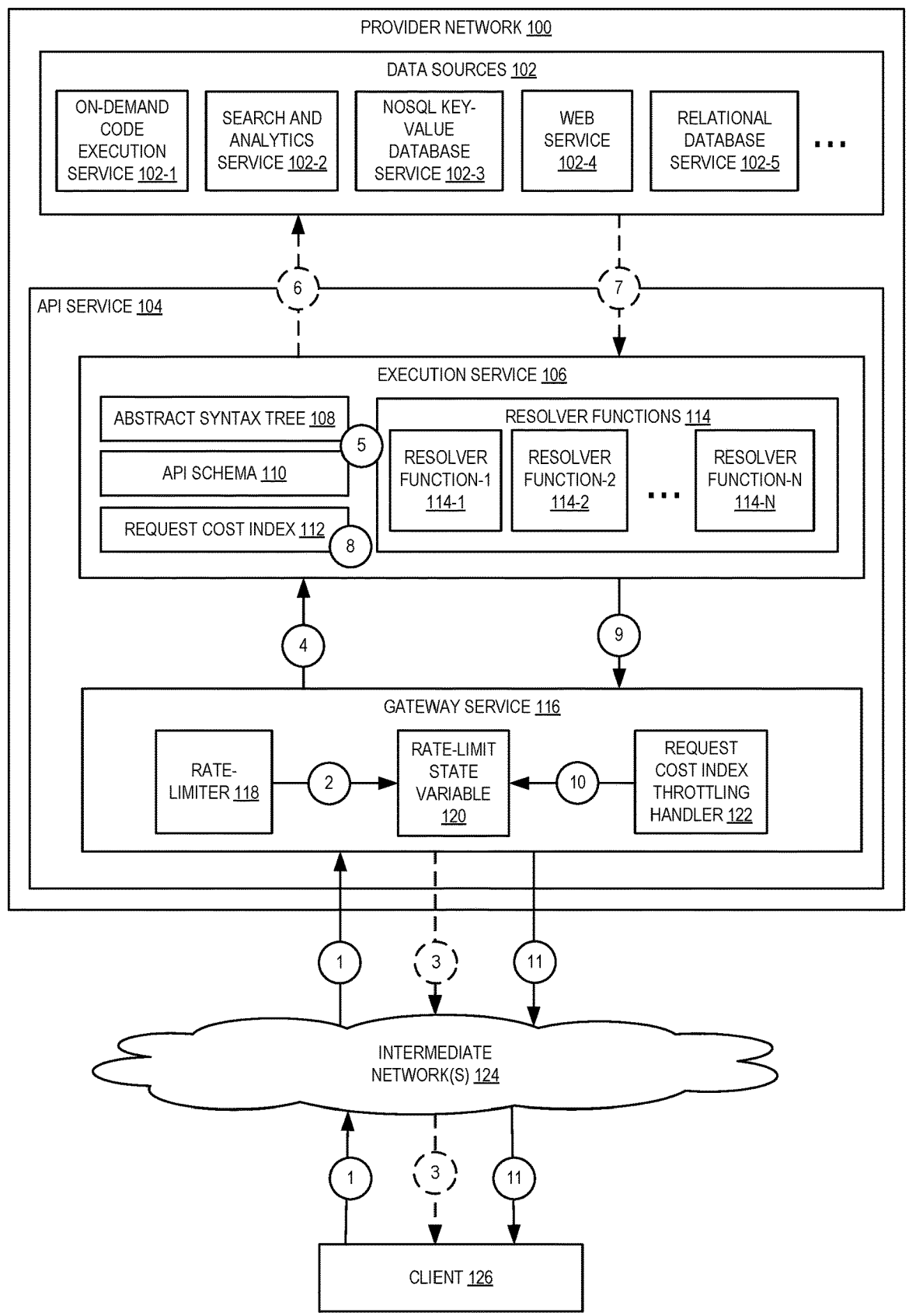
FIG. 1 is a diagram illustrating an environment in which steps are performed for calculating and using a request cost index to throttle requests to execute operations in a provider network according to an embodiment.

Computer-implemented techniques for calculating and using a request cost index for throttling of requests to execute operations (API requests) in a provider network are disclosed. In an embodiment, the techniques encompass a method performed by one or more computing devices in the provider network. The method includes the step of receiving a request to execute an operation. The request is received at an API service in the provider network. The method includes the steps of determining to process the request based on a request rate limiting algorithm, executing the operation to yield an operation result, and sending the operation result. The method also includes calculating a request cost index that reflects an amount of computing resources utilized by executing the operation, determining an adjustment amount for a state variable of the request rate limiting algorithm based on the calculated request cost index, and adjusting (e.g., lowering) the state variable by the adjustment amount. Other (e.g., subsequent) API requests received at the API service that are subject to the adjusted state variable can be throttled by the API service depending on the adjustment amount.

As well as a computer-implemented method, the techniques can also be implemented as a system including one or more computing devices to implement the API service and where the API service has instructions which when executed cause the API service to perform the method. The techniques can additionally be implemented as non-transitory storage media storing instructions which when executed by one or more computing devices cause the computing devices to perform the method.

The balance struck between scalability and precision by an API request throttling technique employed by the API service can be vitally important to the success of the service. Scalability refers generally to the number of users that the service can concurrently execute API requests for in a performant manner. The more users the service can concurrently execute requests for in a performant manner, the higher the scalability of the service. Conversely, the fewer users the service can concurrently execute requests for in a performant manner, the lower the scalability of the service. Precision refers generally to the fraction of requests from a user that are correctly rate limited (throttled) by the service among all requests from the user. If the service throttles only requests from a user that should be throttled, then the request throttling technique has high precision. On the other hand, if many requests from the user are throttled that should not be throttled, then the request throttling technique has low precision. A request from a user should be throttled by the service when processing the request would be an unfair utilization by the user of the finite computing resources of the service. The service can achieve high scalability at the expense of low precision or realize high precision at the risk of low scalability. If the precision is too low, then users can become frustrated that their requests are being unnecessarily throttled. If the precision is high but not enough requests are being throttled, then the service risks a user from benefiting from an unfair use of the computing resource capacity of the service, perhaps even to the point that other users notice servicing of their requests being affected by the unfair use.

Rate limiting (throttling) techniques disclosed herein balance the desire for high scalability with the desire for high precision, using a request cost index that accurately measures the amount of computing resources utilized by executing a requested operation. Upon executing the operation, the request cost index for the operation is calculated. A state variable controlling the allowed request rate limit can then be adjusted (e.g., lowered) based on the calculated request cost index. The adjustment can cause subsequent API requests to be throttled.

API requests can vary widely in the amount of computing resources the requests utilize when the requested operations are executed. Furthermore, it can be difficult or impractical to predict the amount of computing resources execution of an operation will utilize from intrinsic characteristics of the request itself. Consequently, a rate limiting approach that is based only on the rate at which requests are received might not achieve the desired balance between scalability and precision. For example, a first user that sends five requests per second can utilize significantly more computing resources of the API service than a second user that sends thousands of requests per second if the operations in the requests sent by the first user are substantially more complex to execute than the operations of the requests sent by the second user. In this example, an approach to rate limiting that is based only on the rate at which requests are received can have low precision and low scalability because the requests from the second user can be throttled while the requests from the first user overwhelm the finite computing resources of the provider network. The request cost index and the techniques disclosed herein overcome the deficiencies of the rate-based approach by considering the actual amount of computing resources utilized by executing operations in API requests when determining whether to throttle requests.

Various factors can affect the total processing time of an API request including the number of fields of the operation of the request that need to be resolved to data (field cardinality), the number of invocations of functions to resolve the fields to the data (the number of resolver function invocations), and the types of data sources from which the field data is fetched by the resolver function invocations (data source types).

Operations, fields, resolver functions, and data sources are discussed in greater detail elsewhere in this disclosure. For now, to illustrate an example of the problem addressed herein, consider two API requests R1 and R2. Request R1 is to execute Operation O1 and Request R2 is to execute Operation O2. Execution of Operation O1 might require only one resolver function invocation while execution of Operation O2 might require seven resolver function invocations. A simple cost metric that counts the number of resolver function invocations might not accurately reflect the computing resource utilization by executing an operation. For example, according to this simple cost metric, Operation O2 utilizes seven times more computing resources than Operation O1. However, due to differences in the executable logic of the different resolver functions invoked by the operations, Operation O2 can in fact utilize an even greater amount of computing resources than Operation O1 (e.g., twenty times more). For similar reasons, and potentially due to differences between different types of data sources from which different resolver functions fetch field data, the total processing time of two operations from the start of operation execution to the end of operation execution can be approximately same but nonetheless execution of the operations can utilize substantially different amounts of computing resources. There may be better metrics that more accurately reflect computing resource utilization. The techniques provide a better metric that more accurately reflects the amount of computing resources utilized by executing operations of requests to execute the operations where the operations can have different field cardinalities, invoke different resolver functions, encompass different numbers of resolver function invocations, and access different types of data sources.

The techniques use a metric (termed herein as "request cost index") that accurately reflects the amount of computing resources utilized by the API service executing an operation of an API request. In one embodiment, the request cost index is calculated as an amount of memory allocated by the API service executing the operation multiplied by the processor time spent by the API service executing the operation. For example, the request cost index can be calculated in terms of bytes of memory allocated multiplied by the processor time in milliseconds spent executing the operation (B-ms).

In an embodiment, to account for the variability between different types of data sources, the request cost index is calculated such that it does not account for computing resources utilized by the API service when invoking or fetching data from data sources external to the API service but does account for computing resources utilized in preparing requests of the data sources and processing responses received from the data sources.

The request cost index calculated for an operation can be compared to a threshold or "fair" request cost index that represents a fair utilization of the computing resources of the API service by an API request. A state variable of a rate limiting algorithm such as a number of tokens in a token bucket can be adjusted (e.g., lowered) by the extent to which the request cost index for the operation exceeds the fair request cost index. As a result of adjusting the state variable, subsequent requests to execute operations can be throttled until the request rate is within an allowed request rate according to the state variable. Over time, this throttling of requests to execute operations based on the request cost index provides an improved balance between reducing or eliminating a reduction in the scalability of the API service resulting from unfair use of the service and throttling requests with high precision.

The techniques proceed in an embodiment by receiving a graph query language (GraphQL) request to execute a GraphQL operation. A determination is made to process the request (not rate limit) based on a rate limit token bucket.

The operation is executed to yield an operation result. A request cost index reflecting an amount of computing resources utilized by executing the operation is calculated. A number of tokens to deduct from the rate limit token bucket is determined based on the request cost index. That number of tokens is deducted from the rate limit token bucket. The operation result is sent to the client computing device. A subsequent request to execute an operation can be throttled depending on the number of tokens deducted from the rate limit token bucket and the rate at which the subsequent request is sent.

Examples of the techniques will now be described with respect to the figures. Many of the examples involve the GraphQL API standard, a current specification of which can be found on the internet at/October2021 in the spec.graphql.org internet domain. However, the techniques are not limited to GraphQL and the techniques can be applied to API requests to execute operations that conform to other API query languages including, but not limited to, the REpresentational State Transfer (REST) API query language or other API query language that conforms to an interface or communication protocol between a client computing device (e.g., a client computing device of a user) and a server computing device, such that if the client computing device makes a request to execute an operation in a format that accords with the interface or communication protocol, the client computing device should receive a response in a specific format or cause execution of the operation to be initiated.

Turning first to FIG. 1, it is a diagram illustrating an environment in which steps are performed for calculating and using a request cost index to throttle requests to execute operations in a provider network according to an embodiment. The steps are depicted in FIG. 1 within numbered circles. Directional arrows between components in the environments are intended to represent one direction of data flow but not necessarily the exclusive direction.

In summary, the steps proceed at Step 1 where client computing device 126 sends a request to execute an operation. The request is received at gateway service 116 of API service 104 in provider network 100 via intermediate network(s) 124.

At Step 2, rate limiter 118 determines whether the request should be throttled according to rate-limit state variable 120. If rate-limiter 118 determines that the request should be throttled, then, at Step 3, gateway service 116 sends a response to the request. The response is received at client computing device 126 via intermediate network(s) 124. The response indicates that the request was throttled such as by the HyperText Transfer Protocol (HTTP) 429 response code for "Too Many Requests."

On the other hand, if rate-limiter 118 determines that the request should not be throttled according to rate-limit state variable 120, then, at Step 4, gateway service 116 sends the operation of the request to execution service 106 of API service 104 for execution.

At Step 5, execution service 106 executes the operation which can involve generating abstract syntax tree 108 representation of the operation, applying API schema 110 to the operation, and executing one or more resolver functions 114.

Step 6 represents the possibility that the one or more resolver functions 114 fetch data or otherwise access a data source of data sources 102 when executed.

Step 7 represents the fetched data or other data returned by a data source to the accessing resolver function(s).

At Step 8, request cost index 112 representing an amount of computing resources utilized by execution service 106 executing the operation is calculated.

At Step 9, an operation result of the operation and a rate-limit state variable adjustment amount determined based on request cost index 112 is sent to gateway service 116.

At Step 10, request cost index throttling handler 122 of gateway service 116 adjusts rate-state variable 120 by the rate-limit state variable adjustment amount received from execution service 106.

At Step 11, the operation result is sent by gateway service 116 and received at client computing device 126 via intermediate network(s) 124.

As an example, the request sent at Step 1 can be a GraphQL request specifying a GraphQL query, mutation, or subscription operation. The rate-limiter 118 can be based on a request rate-limiting algorithm such as a token or "leaky" bucket algorithm. One or more resolver functions 114 can be executed by execution service 106 to carry out the requested query, mutation, or subscription operation. The calculated request cost index 112 of the requested query, mutation, or subscription operation can reflect an amount of computing resources of execution service 106 utilized to execute one or more resolver functions 114. If request cost index 112 exceeds a fair request cost index, then a token deduction amount can be determined based on the extent to which request cost index 112 exceeds the fair request cost index. A number of tokens equal to the token deduction amount can then be deducted from a token bucket by request cost index throttling handler 122. Subsequent requests sent by client computing device 126 that are metered by the same token bucket can be throttled by rate-limiter 118 if there are then insufficient tokens in the token bucket. In this example, the greater the computing resource utilization by the metered request beyond what is considered a fair use as represented by the fair request cost index, the more tokens deducted from the token bucket and, hence, the more likely a subsequent request metered by the same token bucket will be throttled.

Figure 2:
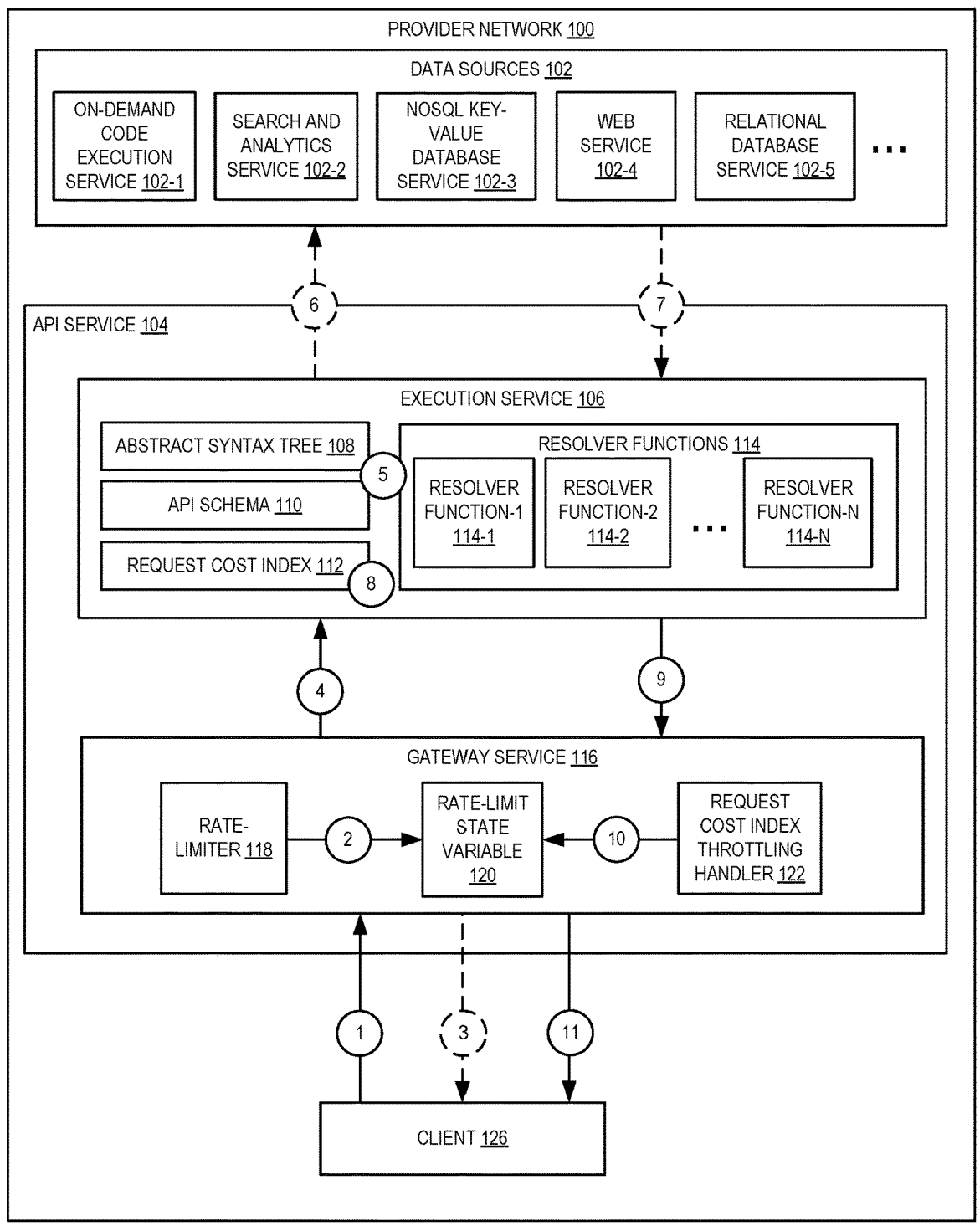
FIG. 2 is a diagram illustrating a variation to the environment of FIG. 1 according to an embodiment.

Before discussing the techniques in greater detail some discussion of various components in the environments of FIG. 1 and FIG. 2 are provided.

Provider network 100 is programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over one or more intermediate network(s) 124 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand. There can be a sense of location independence in that the user generally can have no control or knowledge over the exact location of provided resources but can specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability is provided to a user using the provider's software applications running on the infrastructure of provider network 100. The applications can be accessible from various client devices through either a thin client interface such as a web browser, or a program interface. The infrastructure includes the hardware resources such as server, storage, and network components and software deployed on the hardware infrastructure that are necessary to support the services being provided.

Typically, under the SaaS model, the user does not manage or control the underlying infrastructure including network, servers, operating systems, storage, or individual application capabilities, except for limited user-specific application configuration settings. With PaaS, the user is provided the capability to deploy onto hardware and software infrastructure of provider network 100 user-created or acquired applications using programming languages, libraries, services, and tools supported by the provider or other sources.

Typically, under the PaaS model, the user does not manage or control the underlying hardware and software infrastructure including network, servers, operating systems, or storage, but has control over the deployed applications and possibly configuration settings for the application-hosting environment.

With IaaS, the user is provided the capability to provision processing, storage, networks, and other fundamental computing resources where the user can deploy and run arbitrary software, which can include operating systems and applications. The user does not manage or control the underlying hardware and software infrastructure but has control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 is provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 is provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure is provisioned for open use by the public. The public cloud can be owned, managed, and operated by a business, academic, or government organization, or some combination of them. A public cloud exists on the premises of the public cloud provider.

In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100 (e.g., via on-demand code execution service 102-1), which in turn uses one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across intermediate network(s) 124 (e.g., the internet, a cellular network, etc.) via an interface, such as through use of an application programming interface (API) call, via a console implemented as a website or application, etc.

An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Data sources 102 are programmed or configured to provide services in provider network 100. Data sources 102 offer APIs to resolver functions 114 for accessing the services. Resolver functions 114 can access data sources 102 to fetch (retrieve) data from data sources 102 or to mutate (change) data managed by data sources 102. The APIs offered by data sources 102 to API service 104 can also be offered to other services in provider network 100 and to users over intermediate network(s) 124.

Data sources 102 can include different types. However, no particular type of data source is required. In the example of FIG. 1, data sources 102 include on-demand code execution search 102-1, search and analytics service 102-2, NOSQL key-value database service 102-3, web service 102-4, and relational database service 102-5, among other possible types of services. While data sources 102 are depicted in FIG. 1 within provider network 100, some or all of data sources 102 can be located external to provider network 100 such as, for example, located in one or more other provider networks that are accessible via intermediate network(s) 124. While multiple data sources 102 are depicted in the environment of FIG. 1, the environment can have as a few as one data source or more data sources than depicted.

On-demand execution service 102-1 is configured or programmed provide an event-driven, serverless computing service and offer an API for accessing and using the service. Service 102-1 can run code in response to events. Service 102-1 can be programmed or configured to automatically manage the computing resources required by the executed code. Execution of code can be triggered by an event such as an API call, a sensor output, or message passing from other code executed by service 102-1. "Serverless" computing refers to a cloud computing execution model in which provider network 100 allocates machine resources on demand taking care of the servers on behalf of users. While execution of code by service 102-1 is not strictly serverless, developers of the code need not be concerned with capacity planning, configuration, management, maintenance, fault tolerance, or scaling of execution containers of the code by service 102-1. Serverless computing might not hold resources in volatile memory when code is not being executed. Instead, computing by service 102-1 can be accomplished in short bursts and on-demand (in response to events) with results persisted to storage. When code is not being executed, computing resources of service 102-1 might not be allocated to the code.

Search and analytics service 102-2 is configured or programmed to provide search and analytics services and an API for accessing the service. Service 10-2 can support various use cases such as log analytics, real-time application monitoring, and clickstream analysis.

NOSQL key-value database service 102-3 is configured or programmed provide a NOSQL database service and offer an API for accessing the service. The NOSQL database service can support key-value and document data structures. A key-value pair (also known as a name-value pair, attribute-value pair, or field-value pair) is a fundamental data representation in computing systems and application. A database managed by service 102-3 can conform to a data model expressed as a collection of 2-tuples in the form <key, value> with each element being a key-value pair.

Web service 102-4 is configured or programmed to response to HTTP requests with HTTP responses.

Relational database service 102-5 is configured or programmed to provide a distributed relational database management service and offer an API for accessing the service.

API service 104 is configured or programmed to provide an API query language interface for client-server applications. An application developer can use API service 104 to program or configure an application API for a client-server application such as, for example, a web or mobile application. API service 104 can be viewed as a managed service where an application developer programs or configures their application API with API service 104. API service 104 takes care of processing and responding to requests via the API query language interface in accordance with the specified application API. In this way, a separation of concerns is achieved where the application developer is freed to focus on the design of the application API with less concern about implementing and operating and providing the computing resources for the API query language interface that supports execution of the application API.

In an embodiment, API service 104 supports the GraphQL API query language. GraphQL is a query language designed to build client-server applications by providing an intuitive and flexible syntax and system for describing data requirements and interactions of the applications. A client computing device (e.g., device 126) can use the query language to make requests to API service 104. A request can contain an operation such as a query, mutation, or subscription. A request is defined as a syntactic grammar in which terminal symbols are tokens. The tokens are defined in a lexical grammar which matches patterns of permitted source characters (e.g., UNICODE code points U+0009, U+000A, U+000D, and U+0020 through U+FFFF). A request can be composed of a sequence of permitted source characters.

A request can request to execute a query, mutation, or subscription operation. A query can be a read-only fetch operation. A mutation can be a write operation followed by a fetch operation. A subscription can be a long-lived request that fetches data in response to source events. Regardless of operation type, each type of operation can be specified in a request by an optional operation name and a selection set. A selection set is a set of one or more selections where a selection can be a field. A field describes a discrete piece of information available to request within a selection set. A field can itself contain a selection set to form nested or deeply nested requests. This ability to form nested requests to describe complex data or relationships to other data contributes to the wide variability in the amounts of computing resources utilized by executing different operations. The request cost index disclosed herein accurately measures the amount of computing resources utilized by different operations from simple operations with no nested selection sets and complex operations with nested selection sets. Ultimately, an operation can specify their selections down to fields which return scalar values to ensure an unambiguously shaped operation result of the operation.

The following is an example of a request specifying a query operation to fetch the name of the user with id "13". In this example, the keyword "query" is omitted from Line 00 and the request is interpreted by API service 104 as a query type operation by default (e.g., as opposed to a mutation or subscription operation). In this example, both "user" (Line 01) and "name" (Line 02) are fields and a selection set requesting the "name" field is nested within the "user" field of the top-level selection set. The request might be sent by device 126 and received by an application API of API service 104, as in Step 1 of FIG. 1, for example.

Line 00: {
01: user(id: 13) {
02: name
03:}
04:}

The query operation when executed by execution service 106 might yield the following operation result. The operation result can be sent by execution service 106 and received by gateway service 116 as in Step 9 of FIG. 1, for example, and then sent by API service 104 and received by client device 126, as in Step 11 of FIG. 1, for example.

00: {
01: "user": {
02: "name": "Davis Ghosh"
03:}
04:}

The above example illustrates how the shape of an operation result can mirror the shape of the request to execute the operation such that the operation result provides exactly the information that is requested and nothing more, thereby avoiding over-fetching and under-fetching data.

The following is an example of a request containing a mutation operation that might be sent by device 126 and received by an application API at API service 104, as in Step 1 of FIG. 1, for example. In this example, the "likeCount" field is a field of a selection set nested within the "story" field which is a field of a selection set nested within the "likePost" field which is a field of the top-level selection set. In the example, the keyword "mutation" is used in Line 00 to distinguish the operation from a query operation and a subscription operation.

```
00: mutation {
01: likePost(postID: 12345) {
02: story {
03: likeCount
04:}
05:}
06:}
```

The above example mutation operation requests to "like" a post and then fetches the new number of likes.

The following is an example of a request containing a subscription operation that might be sent by device 126 and received by an application API at API service 104, as in Step 1 of FIG. 1, for example. In the example, the keyword "subscription" is used in Line 00 to distinguish the operation from a query operation and a mutation operation.

```
00: subscription NewMessages {
01: newMessage(roomId: 123) {
02: sender
03: text
04:}
05:}
```

The above-example subscription operation subscribes to new messages posted to chat room 123. While a client is subscribed, whenever new messages are posted to chat room with ID "123", the fields for "sender" and "text" will be resolved by API service 104, as in Step 5 of FIG. 1, for example, and published to client 126, as in Step 11 of FIG. 1, for example.

Execution service 106 is programmed or configured to execute operations in requests to execute the operations sent from clients (e.g., client 126). For example, execution service 106 can be programmed or configured to execute queries, mutations, and subscription operations. If the operation is a query or a mutation operation, then the operation result of executing the operation by execution service 106 can be the result of executing the operation's top-level selection set. If the operation is a subscription, then the operation result can be an event stream where each event in the event stream can be the result of executing by execution service 106 the subscription operation for each new event in an underlying source event stream. Execution of a subscription operation by execution service 106 can create a persistent function on API service 104 that maps the underlying source event stream to a returned response event stream.

Returning to the chat application example above, to subscribe to new messages posted to a chat room, client 126 might send the above request to execute the "NewMessages" subscription operation. While the client 126 is subscribed, whenever new messages are posted to chat room with ID "123", the fields for "sender" and "text" will be resolved by execution service 106, as in Step 5 of FIG. 1, for example, and published to client 126, as in Step 11 of FIG. 1, for example. For example, client 126 might receive the following operation result from API service 104 when a new message is posted to chat room "123":

```
00: {
01: "data": {
02: "newMessage": {
03: "sender": "Trott",
04: "text": "Did you finish that TPS report?"
05:}
06:}
07:}
```

Execution service 106 can be programmed or configured to represent a requested operation as an abstract syntax tree (e.g., tree 108) according to an API schema (e.g., API schema 110). The API query language (e.g., GraphQL) can be defined as a syntactic grammar where terminal symbols are tokens. Tokens can be defined in a lexical grammar which matches patterns of source characters. The result of parsing a sequence of source characters of a request by execution service 106 can produce a sequence of lexical tokens according to the lexical grammar. Abstract syntax tree 108 can then be produced by execution service 106 according to the syntactical grammar.

In an embodiment, an application developer defines API schema 110 which determines their application API contract for a client application to communicate with by means of an API query language. For example, the API query language can be GraphQL over the HyperText Transport Protocol (HTTP) as the application network layer transport protocol. As used herein, the term "HTTP" is intended to include cryptographically secured variants commonly referred to as "HTTPS". Although only one API schema 110 is depicted in FIG. 1, API service 104 can support and provide an API query language interface for multiple different application APIs as defined by multiple different API schemas. Thus, API schema 110 should be viewed as generally representative of one of many possible API schemas at API service 104. Likewise, abstract syntax tree 108 should be viewed as generally representative of abstract syntax tree representation of one requested operation of one application API where API service 104 can generate many abstract syntax tree representations of many different requested operations of many different requests of many different application APIs.

Upon receiving an operation of a request of an application API, execution service 106 can convert the operation to abstract syntax tree 108 representation according to API schema 110 that defines the application API. Leaf nodes of abstract syntax tree 108 can be associated with one or more resolver functions 114 by API schema 110. The attached resolver functions are responsible for resolving fields of the operation to data. A resolver function can resolve a field to data by fetching the data from a data source. A field can be resolved to a scalar data type or a collection of scalar data types such as, for example, a string, an integer, a list of strings, a list of integers, a set of strings, a set of integers, a dictionary containing a mix of strings and integers, etc. However, API service 104 can allow an application developer to define API schema 110 such that a field can be resolved by execution service 106 to one or more instances of a complex data type. The complex data type can be defined in API schema 110 in terms of fields that require further resolving by execution service 106 by executing one or more additional resolver functions. As such, execution service 106 can add new nodes to abstract syntax tree 108 corresponding to new fields needing to be resolved as the operation is executed by execution service 106 and as data returned from data sources 102 is processed by resolver functions 114. Because this ability provided by API service 104 to dynamically resolve fields in data fetched from data sources 102, a seemingly simple operation can require many fields to be resolved when executed by execution service 106.

Consider the following example API schema that defines at Line 04 a query operation "getTodos" that returns a list of "Todo" objects.

```
00: schema {
01: query:Query
02:}
03: type Query {
04: getTodos: [Todo]
05:}
06: type Todo {
07: id: String
08: name: String
09: description: String
10: priority: Int
11: comments: [Comment]
12:}
13: type Comment {
14: todoid: String
15: commentid: String
16: content: String
17:}
```

According to the above API schema, resolving the "getTodos" field of the following query operation can involve N+1 resolver function invocations where N is the number of "Todo" objects in the list of "Todo" objects to which the "getTodos" field is resolved by a resolver function associated with a node of an abstract syntax tree representation of the query, the node representing the "getTodos" field of the query operation.

```
00: query {
01: getTodos {
02: id
03: name
04: comments {
05: commentid
06: content
07:}
08:}
09:}
```

Execution of the above query operation by execution service 106 can involve N resolver function invocations in addition to the one resolver function invocation for the "getTodos" field, one resolver function invocation for each "Todo object" in the fetched list to resolve the "comments" field of each "Todo" object to a fetched list of "Comment" objects for the "Todo" object. For each of the N instances of the "comments" field that need to be resolved, execution service 106 can add descendent nodes of the node representing the "getTodos" field to the abstract syntax tree representation of the query operation. Each of those descendant nodes can be associated with a resolver function for resolving the "comments" field. The mapping between a field and the resolver function for resolving that field can be defined in the API schema.

The above example illustrates how a simple operation involving a small number of specified fields can require a much larger number of fields instances that need to be resolved. Thus, a metric that counts the number of fields referenced in an operation might not accurately reflect the amount of computing resources utilized to execute the operation. Counting the number of resolver function invocations can be more accurate. However, resolver functions themselves can vary in their execution complexity and computing resources utilized. Thus, even this metric can be too inaccurate. The request cost index metric disclosed herein accurately accounts for the computing resources utilized by executing an operation by measuring the amount of computing resources (e.g., memory and processor time) utilized by the resolver function invocations caused by the operation.

As mentioned, each application API available at API service 104 can be defined by a respective API schema 110. API schema 110 is used by API service 104 to determine if a requested operation is valid for the respective application API. API schema 110 can define the shape of the data that flows through the application API. The API query language supported by API service 104 can be strongly typed such that API service 104 validates requested operations of the application API against the API schema 110.

Request cost index 112 is a measurement of the computing resource cost to execution service 106 to execute a requested operation. In an embodiment, request cost index 112 measures the amount of computing resources of execution service 106 utilized by executing the requested operation in terms of processor and memory utilization. Processor utilization can be measured by an amount of time spent by a processor of execution service 106 executing instructions that carry out the requested operation. Memory utilization can be measured by an amount of heap memory allocated at execution service 106 because of executing the requested operation.

The processor utilization and memory utilization of executing a requested operation can vary depending on the resolver functions 114 invoked during execution of the requested operation. A resolver function can be executed to resolve a field instance to data. API schema 110 can attach a resolver function to a field such that when an instance of the field needs to be resolved execution service 106 invokes the attached resolver function. This resolving can involve fetching data from a data source. In addition, a resolver function can be programmed or configured with transformation and execution logic that when executed performs various processor and memory utilizing operations including, but not limited to, building a data source request to fetch data from a data source, mapping data fetched from a data source to data structures more compatible with the API query language, and building a response to be returned by the resolver function invocation. Such operations can involve processor and memory intensive operations such as serializing and deserializing data objects between a data serialization format used by a data source (e.g., JavaScript Object Notation) and the API query language format (e.g., GraphQL), among other possible transformation and execution logic operations of the resolver function.

In an embodiment, request cost index 112 for a requested operation reflects an amount of processor time spent and an amount of memory allocated by execution service 106 for all resolver function invocations by execution service 106 for the requested operation. Request cost index 112 can be calculated as the sum of "per-node" or "node" request cost indexes. Each node request code index reflects an amount of processor time spent and an amount of memory allocated by execution service 106 for one respective resolver function invocation. The term "node" is used because the resolver function invocation corresponds to a node in abstract syntax tree 108 representation of the requested operation where the node represents the field instance that is resolved by the resolver function invocation. While request cost index 112 can be calculated as a sum of node request cost indexes, request cost index 112 can be an average, mean, or other statistical formulation of the set of node request cost indexes calculated for the requested operation.

In an embodiment, processor time refers to the amount of time a processor of execution service 106 is used for processing instructions of a resolver function. Where the processor executes multiple resolver functions concurrently as often the case with execution service 106 due to a multi-tenant nature of API service 104, the processor time to execute a resolver function will typically be less than the elapsed time to execute the resolver function as there typically will be portions of the elapsed time when instructions of the resolver function are not being executed by the processor, for example, because the thread or process in which the instructions of the resolver function execute is waiting on input/output (I/O) or incurring a multi-tasking delay. In some instances, instructions of a resolver function can be executed by multiple processors of execution service 106 in a parallel processing manner. In this case, the node processor time of the resolver function can be calculated as the sum of the processor times for each of the multiple processors. In this case, the node processor time for a resolver function executed in a parallel processing manner can be greater than the elapsed time to execute the resolver function. While the node processor time can be calculated as a sum, an average, mean, or other statistical formulation of the set of per-processor processor times can be calculated as the node processor time.

A resolver function can execute on various different types of processors and a processor time to execute the resolver function can reflect the time spent by various different types of processors executing the resolver function. For example, a processor that executes a resolver function can be a physical central processing unit (physical CPU), a core of a multi-core microprocessor, or a logical CPU of a multi-threaded microprocessor core. As such, a processor time for a resolver function execution can reflect a CPU time, a CPU core time, or logical CPU time. If a resolver function executes in a virtualized computing environment, then the resolver function can be executed by one or more virtual CPUs (or vCPUs). In this case, processor time can reflect a vCPU time spent executing instructions of the resolver function.

In an embodiment, memory allocated by a resolver function refers to memory space allocated on the heap because of executing the resolver function. The resolver function can be programmed or configured in a high-level computer programming language that provides runtime memory management capabilities such as garbage collection or reference counting such that the programmer of the resolver function is not explicitly responsible for ensuring that memory allocated on the heap is reclaimed before the resolver function execution ends. For example, a resolver function can be programmed or configured in PHYTHON, JAVA, or the high-level programming language that provides an implicit deallocation experience to the programmer. To do this, the language runtime provides a way to automatically reclaim memory allocated on the heap by the resolver function without relying on express programmed or configured instructions to do so. One way the language runtime can do this is by using a garbage collector. The garbage collector runs periodically to check for memory allocated on the heap that is no longer being used by a resolver function execution and reclaims it for use by other resolver function executions. However, the garbage collection process itself consumes computing resources of execution service 106 where generally, for a given resolver function execution, the greater number of memory objects the resolver function execution allocates on the heap, the greater the utilization of computing resources of execution service 106 by the garbage collection process to reclaim the allocated memory space.

In an embodiment, request cost index 112 calculated for a requested operation incorporates the amount of heap memory allocated by the resolver functions executed by execution service 106 to carry out the requested operation. By doing so, request cost index 112 indirectly reflects the computing resources utilized by runtime memory management operations such as garbage collection of the heap memory allocated. In addition, since memory space of execution service 106 is finite and can be shared by many resolver function executions and operation executions, by incorporating the amount of heap memory allocated into request cost index 112, it reflects the share of finite memory space that the executing the requested operation consumed.

At Step 1, a request to execute an operation sent by client device 126 is received at gateway service 116. Before the requested operation is executed by execution service 106, rate limiter 118 of gateway service 116 can determine, at Step 2, whether the request should be processed further or whether the request should be throttled. Rate limiter 118 can be programmed or configured to make this determination according to a request rate-limiting algorithm and rate-limit state variable 120. Throttling a request by gateway service 116 can include not sending the requested operation to execution service 106 to be executed or otherwise discarding or rejecting the requested operation. Gateway service 116 can also be programmed or configured to throttle a request by sending a response to the request (e.g., to client 126) indicating that the request is throttled. For example, gateway service 116 can send a HTTP response with response status code 429 for "Too Many Requests."

Alternatively, throttling can include placing the throttled request from a user in a wait or holding queue. While the wait or holding queue for the user is non-empty, requests can be dequeued and processed by API service 104 from the wait or holding queue at a fixed rate such that the overall request processing rate of API service 104 for the user is capped. If a new request from the user arrives at API service 104 when the wait or holding queue for the user is not empty, the request can be added to the queue to wait its turn for processing. However, if the wait or holding queue for the user is empty, then non-throttled requests by the user can be processed without having to go through the queue.

Various different rate-limiting algorithms can be used by rate limiter 118 to determine whether a request should be throttled. For example, a token bucket algorithm or a leaky bucket algorithm can be used. With a token bucket algorithm, one or more tokens are added to a token bucket on a time interval (e.g., one token per second). The token bucket is programmed or configured to hold a maximum number of tokens. When the token bucket is full, additional tokens are not added to the token bucket. One or more tokens are deducted from the token bucket when a request is received. When a request to execute an operation is received at gateway service 116, the request can be throttled by gateway service 116 if the token bucket is empty or has a negative token balance. On the other hand, gateway service 116 can forward the requested operation to execution service 106 for execution if the token bucket has a positive token balance when the request is received.

With a token bucket algorithm, rate-limit state variable 120 can be the number of tokens in a token bucket or other state variable of the token bucket algorithm that controls whether requests subject to rate limiting by the token bucket are throttled. Rate limiter 118 can be programmed or configured to maintain multiple token buckets and hence multiple rate-limit state variables. The number of token buckets maintained can vary depending on the desired level of granularity for request rate-limiting. For example, rate limiter 118 can be configured to maintain a token bucket on a per-application API, per-user account, per-client computing device, per-group of users, per-organization, per-company, or other level of request rate-limiting granularity dictated by the requirements of the particular implementation at hand.

In an embodiment, a token bucket is implemented by rate limiter 118 by a counter and a timestamp. The counter counts the number of tokens in the token bucket. The timestamp indicates a time that the last request subject to request rate metering by the token bucket was received by gateway service 116. When the next request that is subject to metering by the token bucket is received, the difference between a time of receiving the request and the timestamp of the last received request is determined and the difference determines how many tokens to add to the token bucket. Rate limiter 118 can then determine if there is a sufficient number of tokens in the token bucket to process the request.

With a leaky bucket algorithm, requests received at gateway service 116 are added to a queue. Requests are processed from the head of the queue. If the queue is full when a request is received, then gateway service 116 can throttle the request. With a leaky bucket algorithm, the state variable 120 can be the rate at which requests are processed from the head of the queue or other state variable of the leaky bucket algorithm that controls whether requests subject to rate limiting by the queue are throttled. Like with a token bucket, rate limiter 118 can maintain multiple leaky bucket queues at various different levels of granularity.

If a received request is not throttled by gateway service 116, then, at Step 4, the request to execute the operation or the requested operation is sent or forwarded to execution service 106 for execution. At Step 5, the requested operation is executed. Such execution can include applying API schema 110 to the requested operation, generating abstract syntax tree 108 representation of the requested operation, executing one or more resolver functions 114, and calculating request cost index 112 for the requested operation. In an embodiment, calculating request cost index 112 includes calculating a node request cost index for each resolver function execution of the requested operation. Request cost index 112 is the calculated as the sum of the per-node request cost indexes. Alternatively, the average, the mean, or other statistical formulation of the per-node request cost indexes is calculated. If executing the requested operation by execution service 106 involves just a single resolver function invocation, then request code index 112 can be the node request cost index calculated for that resolver function invocation.

While request cost index 112 can be calculated based on only one or more per-node request cost indexes for one or more resolver function invocations, request cost index 112 can be calculated based on additional request cost indexes such as a request cost index reflecting an amount of computing resources of execution service 106 utilized to execute logic of the requested operation other than logic of a resolver function. However, request cost index 112 preferably reflects at least an amount of computing resources utilized to execute the resolver function(s) invoked by the requested operation. The resolver function(s) invoked by a requested operation are typically programmed or configured by application developers to meet the requirements of a particular application API or a particular application. As such, the complexity of resolver functions 114 can vary greatly between different applications, different application APIs, and possibly even different application developers, and in ways that are not under direct control of provider network 100. Thus, by accounting for the computing resources utilized by executing resolver functions 114, request cost index 112 accounts for factors that contribute to the variability in computing resource utilization by executing the requested operation.

In an embodiment, request cost index 112 is a measurement in terms of bytes of memory allocated to execute the requested operation multiplied by the processor time spent executing the requested operation. For example, request cost index 112 can be a number of bytes, kilobytes, megabytes, or gigabytes of memory allocated for the requested operation multiplied by the number of nanoseconds, milliseconds, or seconds of processor time spent executing the requested operation. Likewise, a node request cost index can be calculated as an amount of memory allocated to execute a respective resolver function multiplied by the processor time spent executing the respective resolver function.

A resolver function can be executed by execution service 106 in the context of a thread of execution or a process (e.g., an operating system user process, thread, or the like). Determination of the amount of memory allocated by executing a resolver function can be based on the amount of memory allocated by the thread or the process that executes the resolver function. For example, the amount of memory allocated to execute the resolver function can be calculated based on the difference between (a) the amount of memory allocated by the thread or process that executes the resolver function just before or at the start of resolver function execution, and (b) the amount of memory allocated by the thread or process just after or at the end of resolver function execution. This difference represents the amount of memory allocated by the thread or process while executing the resolver function. Other techniques for determining the amount of memory allocated by executing a resolver function can be used according to the requirements of the particular implementation at hand. No particular technique is required. In an embodiment, the allocated memory measured includes memory allocated on the memory heap that is eventually reclaimed by an automatic memory management process such as a garbage collection process.

While the allocated memory measured can include just memory allocated on a memory heap, the allocated memory measure can include other types of allocated memory such as, for example, other types of dynamic allocated memory allocated in volatile or non-volatile memory.

Determination of the processor time spent by execution service 106 executing a requested operation can include measuring the processor time spent executing instructions programmed or configured to carry out transformation and execution logic of resolver functions(s) invoked to resolve field(s) of the requested operation. Such logic can include building requests of data sources 102, serializing and deserializing data objects to and from a data serialization format, mapping response data received from data sources 102 to API query language data structures, and other programmed or configured logic of a resolver function including, for example, program control flow operations and the operations thereof such as if-then-(else) statements, for loops, while loops, count controlled loops, condition controlled loops, collection controlled loops, general iteration, etc.

Processor time can be measured in various different ways and no particular way is required. For example, processor time can be measured by the processor time consumed by a thread or process that executes a resolver function. Such processor time might not include elapsed time that the thread or process is idle waiting on I/O such as I/O to or from data sources 102. Thus, the processor time to execute a resolver function can generally not be affected by the amount of elapsed time spent by a data source processing and responding to a request from the resolver function.

After request cost index 112 is calculated for a requested operation by execution service 106, a rate limit state variable adjustment amount can be determined based on request cost index 112. In an embodiment, execution service 106 determines the adjustment amount and returns the determined adjustment amount to gateway service 116 at Step 9. Alternatively, execution service 106 can return request cost index 112 at Step 9 and gateway service 116 can determine the adjustment amount based on the received request cost index 112. In either case, the adjustment amount can be determined based on the extent to which request cost index 112 exceeds a fair request cost index. The fair request cost index represents a fair use of the finite computing resources of execution service 106 by a single requested operation.

The fair request cost index can be determined in a variety of different ways. In one way, the fair request cost index is determined empirically based on the request cost indexes calculated for a representative set of requested operations. For example, the fair request cost index can be determined as a predetermined percentile request cost index (e.g., the $75^{th}$, $90^{th}$, or $95^{th}$ percentile request cost index) for the representative set of requested operations. In an embodiment, a margin of safety multiplier (e.g., 2 or 5) is applied to the predetermined percentile request cost index to increase the throttling precision. For example, the empirical determination might involve plotting a bilinear approximation of request cost index percentiles of the representative set of requested operations on a semi-log scale. The breaking point in the plot might be around the $96^{th}$ percentile, for example, corresponding to a request cost index of 215 kilobytes-seconds. This breaking point request cost index can then be multiplied by a margin of safety multiplier (e.g., 5) to produce the fair request cost index of 1,075 kilobytes-seconds.

The foregoing example illustrates just one possible way to determine the fair request cost index. The techniques are not limited to any particular way of determining the fair request cost index including not being limited to empirical ways. For example, instead of a human judging the breaking point of a plot, the breaking point request cost index can be determined automatically according to an algorithm programmed or configured to determine the breaking point request cost index based on a set of request cost indexes calculated for a representative set of requested operations.

In an embodiment, if the request cost index 112 is below the fair request cost index, then the rate limit state variable adjustment amount is zero representing no adjustment. However, if the request cost index 112 is above the fair request cost index, then the adjustment amount can be determined as a function of the extent to which the request cost index 112 exceeds the fair request cost index. In particular, the greater the amount by which request cost index 112 exceeds the fair request cost index, the greater the adjustment amount.

In an embodiment, the adjustment amount where state variable 120 is the number of tokens in a token bucket is determined according to the following formula:

# of tokens to deduct from token bucket=ceiling (RCI/FRCI)−1

Here, RCI is request cost index 112 for the requested operation and FRCI is the fair request cost index. According to the formula, the number of tokens to deduct from the token bucket is zero if RCI is less than or equal to the FRCI. If RCI is greater than FRCI, then the number of tokens to deduct is proportional to the extent to which RCI is greater than the FRCI.

If gateway service 116 receives request cost index 112 from execution service 106 at Step 9, then request cost index throttling handler 122 can determine the adjustment amount for state variable 120. Otherwise, gateway service 116 can receive the adjustment amount from execution service 106. In either case, handler 122, at Step 10, applies a non-zero adjustment amount to state variable 120. For example, if state variable 120 represents a number of tokens in a token bucket and the adjustment amount is non-zero, then handler 122 can deduct the adjustment amount number of tokens from the token bucket. In doing so, a negative token balance can be allowed.

In an embodiment, the adjustment amount determined by execution service 106 or gateway service 116 is capped to avoid throttling requests from a user for an extended period of time. For example, the adjustment amount can be capped so that requests by a user are throttled for no more than sixty seconds. For example, for a token bucket algorithm, if a fair or ordinary request rate by a user is 1,000 tokens per second, then the adjustment amount can be capped at 60,000 tokens so that a large request from the user that results in a high request cost index 112 throttles subsequent requests from the user for no longer than sixty seconds.

By adjusting state variable 120 when the adjustment amount is positive, subsequent requests to execute operations that are subject to request rate limiting by the state variable 120 can be throttled. For example, if state variable 120 is for a token bucket and applying the adjustment amount to state variable 120 causes the token balance in the token bucket to go negative, then requests to execute operations subject to request rate limiting by the token bucket will be throttled until the token balance becomes positive again.

In an embodiment, a positive adjustment amount is applied to state variable 120 only if the average CPU utilization of a processor or a set of processors of execution service 106 over a period of time (e.g., sixty seconds) is above a threshold utilization. This could be done to increase the throttling precision. Specifically, when the CPU utilization of execution service 106 is high (e.g., 80%) but not yet at a high enough utilization (e.g., 99%) where the execution service 106 becomes overloaded executing operations, then API service 104 can begin applying state variable adjustment amounts determined based on calculated request cost indexes to rate-limit state variables to prevent processors of execution service 106 from reaching too high a utilization. The processors can be prevented from being over utilized because requests can be throttled based on the applied rate limit state variable adjustment amounts. However, below the threshold CPU utilization, state variable adjustment amounts could not be applied to rate limit state variables to prevent lowering the throttling precision.

Turning next to FIG. 2, it a diagram illustrating a variation to the environment of FIG. 1 for calculating and using a request cost index for throttling of requests to execute operations in a provider network according to an embodiment. In the variation, client 126 is in provider network 100 whereas in the environment of FIG. 1, client computing device 126 is external to provider network 100 and connected to provider network 100 via intermediate network(s) 124. For example, in the environment of FIG. 2, client 126 can be a computing resource of another service of provider network 100 such as, for example, a computing device of one of data sources 102.

Figure 3:
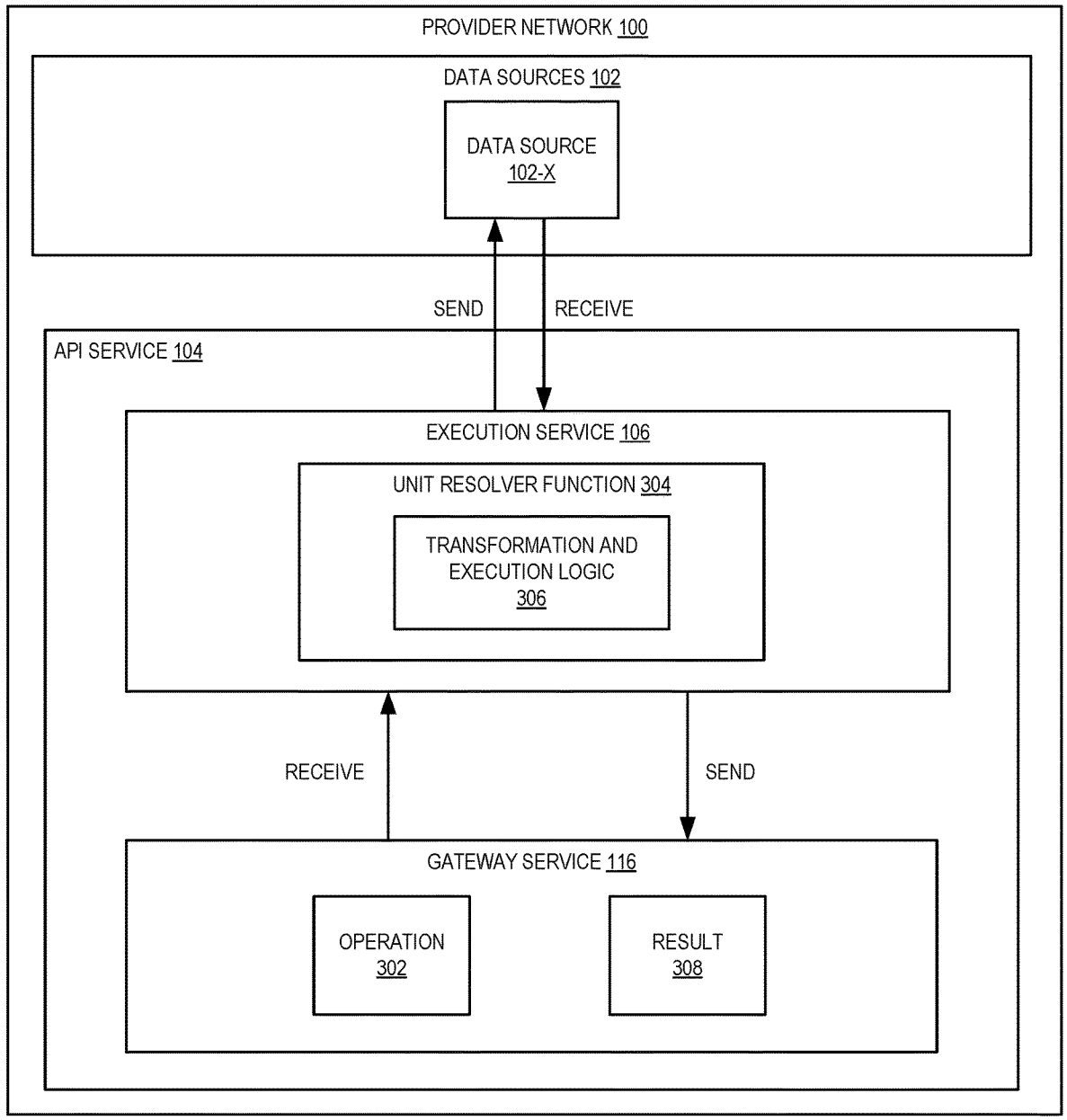
FIG. 3 is a diagram illustrating a simplified view of the environment of FIG. 1 or FIG. 2 that includes a unit resolver function according to an embodiment.

Turning now to FIG. 3, it is a diagram illustrating a simplified view of the environment of FIG. 1 or FIG. 2 that highlights the operation of a unit resolver function according to an embodiment. A requested operation 302 is sent to execution service 106 for execution. Executing requested operation 302 can involve resolving a field to data by invoking unit resolver function 304. Unit resolver function 304 is a resolver function programmed or configured with transformation and execution logic 306. Among other operations, transformation and execution logic 306 is programmed or configured to access one data source designated as data source 102-X. Execution service 106 can return to gateway service 116 operation result 308 of executing requested operation 302. Execution service 106 can generate operation result 308 based on unit resolver function 304 resolving the field to data. Request cost index 112 for requested operation 302 can reflect an amount of computing resources utilized to execute transformation and execution logic 306 of unit resolver function 304. Executing requested operation 302 can involve executing unit resolver function 304 in addition to one or more other resolver functions (including other unit resolver functions) depending on the fields of requested operation 302 that need to be resolved by resolver functions.

Figure 4:
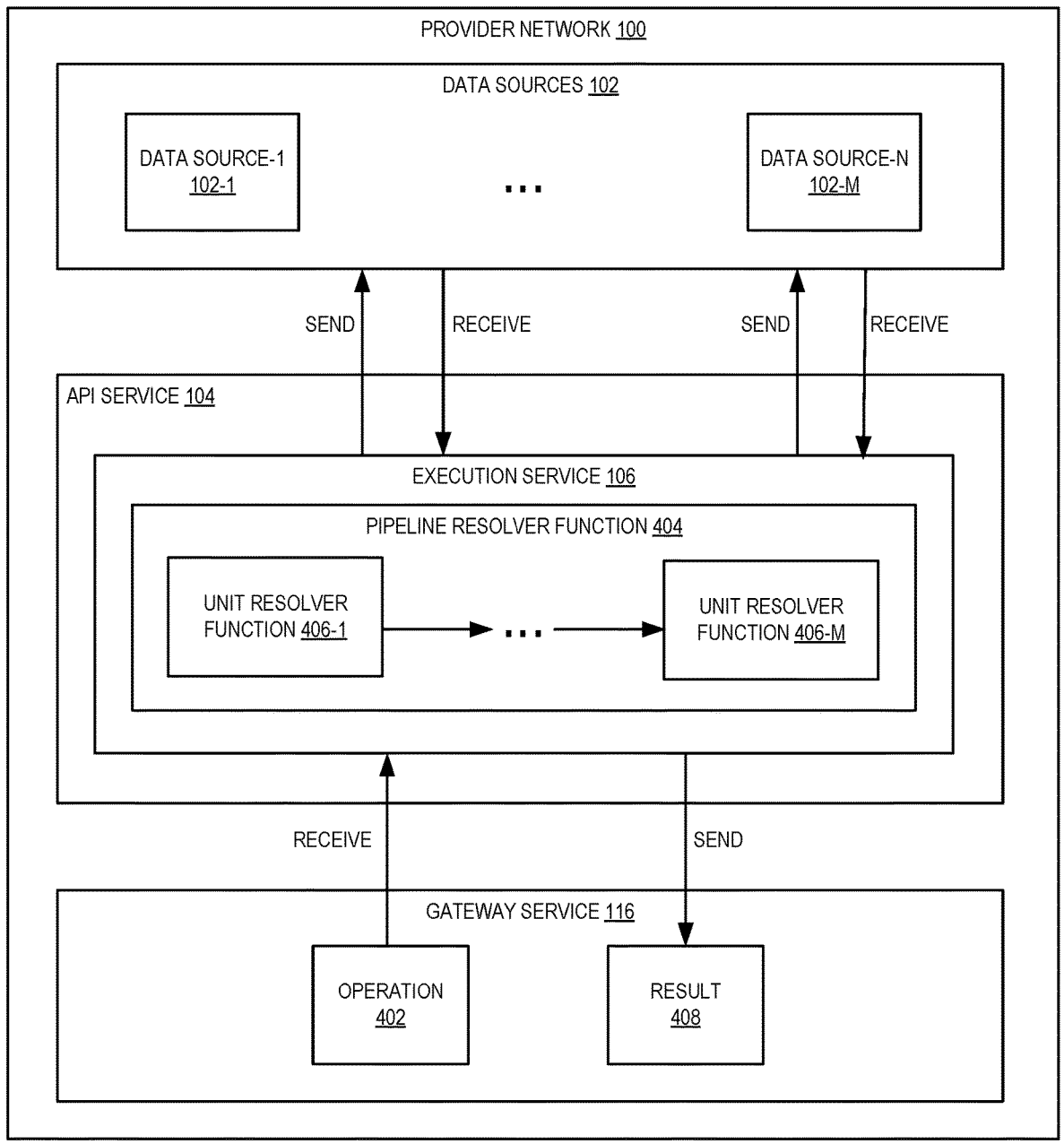
FIG. 4 is a diagram illustrating a simplified view of the environment of FIG. 1 or FIG. 2 that includes a pipeline resolver function according to an embodiment.

Turning now to FIG. 4, it is a diagram illustrating a simplified view of the environment of FIG. 1 or FIG. 2 that highlights the operation of a pipeline resolver function according to an embodiment. A requested operation 402 is sent by gateway service 116 to execution service 106 for execution. Executing requested operation 402 by execution service 106 can involve execution service 106 resolving a field to data by invoking pipeline resolver function 404. Pipeline resolver function 404 is programmed or configured with a sequence of unit resolver functions 406-1 to 406-M that are executed in the sequence order to resolve the field to data. The output or result of an earlier executed unit resolver function in the sequence can be used by a later executed unit resolver function in the sequence (e.g., to form a request of a data source). Each unit resolver function in the sequence can be programmed or configured with transformation and execution logic to access a respective one of the data sources 102-1 to 102-M. Execution service 106 can return to gateway service 116 operation result 408 of executing requested operation 402. Execution service 106 can generate operation result 508 based on pipeline resolver function 404 resolving the field to data. Request cost index 112 for requested operation 402 can reflect an amount of computing resources utilized to execute transformation and execution logics of the unit resolver functions that make up pipeline resolver function 404, as well as other transformation and execution logic of pipeline resolver function 404 such as pre and post pipeline operations. Executing requested operation 402 can involve executing pipeline resolver function 404 in addition to one or more other resolver functions (including other pipeline resolver functions or other unit resolver functions) depending on the fields of requested operation 402 that need to be resolved by resolver functions.

While a resolver function can be programmed or configured to access one or more data sources to resolve a field to data, a "local" resolver function can be programmed or configured to resolve a field to data without accessing a data source. Thus, execution of a requested operation by execution service 106 can involve invoking an executing one or more local resolver functions, one or more unit resolver functions, or one or more pipeline resolver functions.

Figure 5:
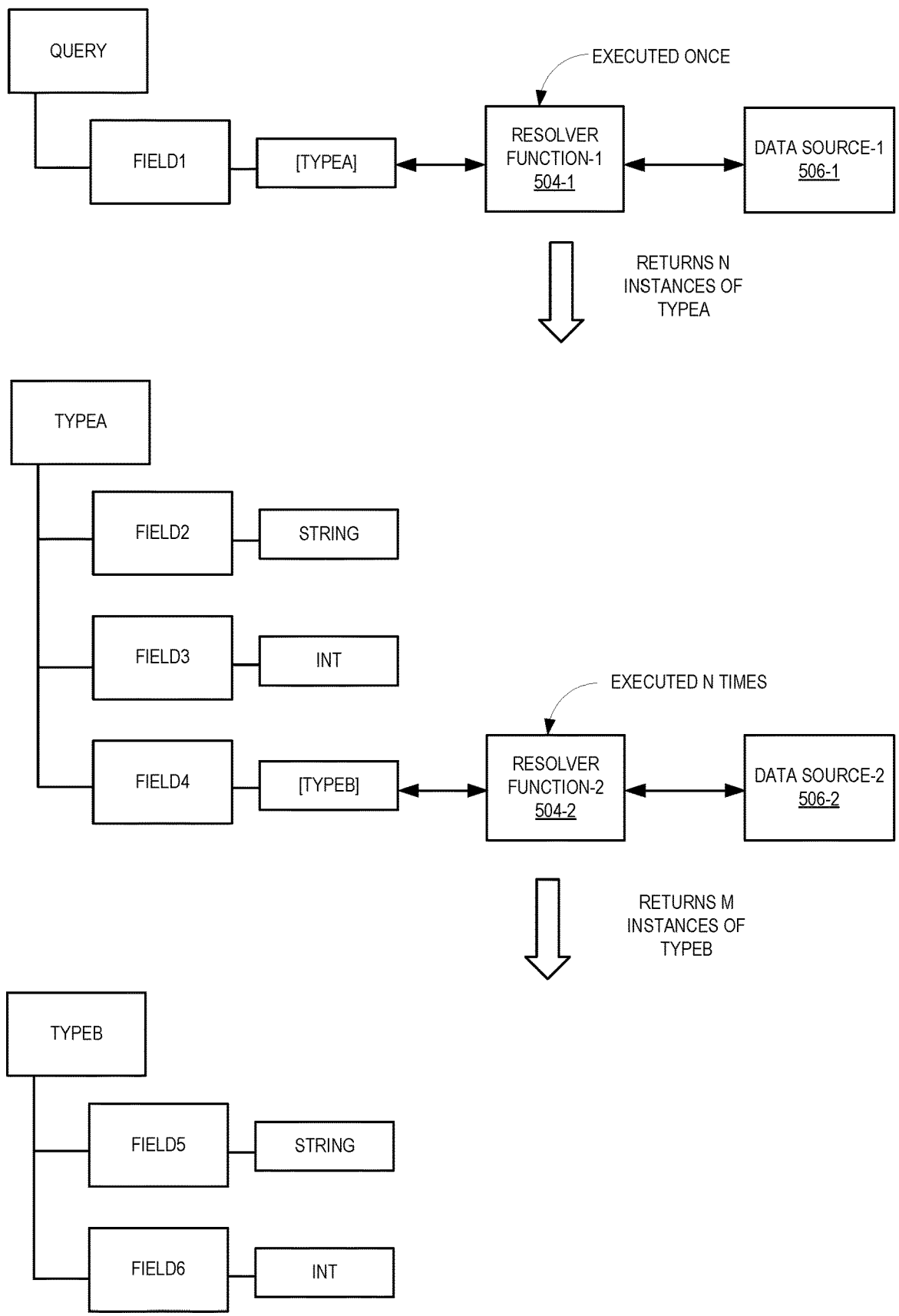
FIG. 5 is a diagram illustrating an example of query operation execution according to an embodiment.

FIG. 5 is a diagram illustrating an example of query execution according to an embodiment. Query operation 502 requires resolving of field FIELD1 of the query operation 502.

Resolver function-1 504-1 is executed by execution service 106 to resolve field FIELD1 of query operation 502 to a list of data objects of type TYPEA. To do this, resolver function-1 504-1 accesses data source-1 506-1. Each data object instance of type TYPEA in the fetched list has a String value for field FIELD2 of the instance that does not need further resolving by a resolver function, an integer value for field FIELD3 of the instance that also does not need further resolving by a resolver function, and a field FIELD4 which needs to be resolved. To do this, resolver function-2 504-2 is executed by execution service 106 for each TYPEA instance returned by the invocation of resolver function 504-1 to resolve field FIELD4 of the TYPEA instance to a data object of type TYPEB. To resolve field FIELD4 of a TYPEA instance to an instance of type TYPEB, resolver function-2 504-2 accesses data source-2 506-2. Each returned instance of type TYPEB has field FIELD5 with a String value that does not need further resolving by a resolver function and field FIELD6 having an Integer value that also does not need further resolving by a resolver function. Thus, executing query operation 502 requires N+1 invocations of a resolver function. One invocation of resolver function 504-1 and N invocations of resolver function-2 504-2 where N is the number of instances of TYPEA in the list provided by the invocation of resolver function 504-1. A request cost index calculated for query operation 502 can reflect an amount of computing resources of execution service 106 utilized to execute the N+1 resolver function invocations.

Figure 6:
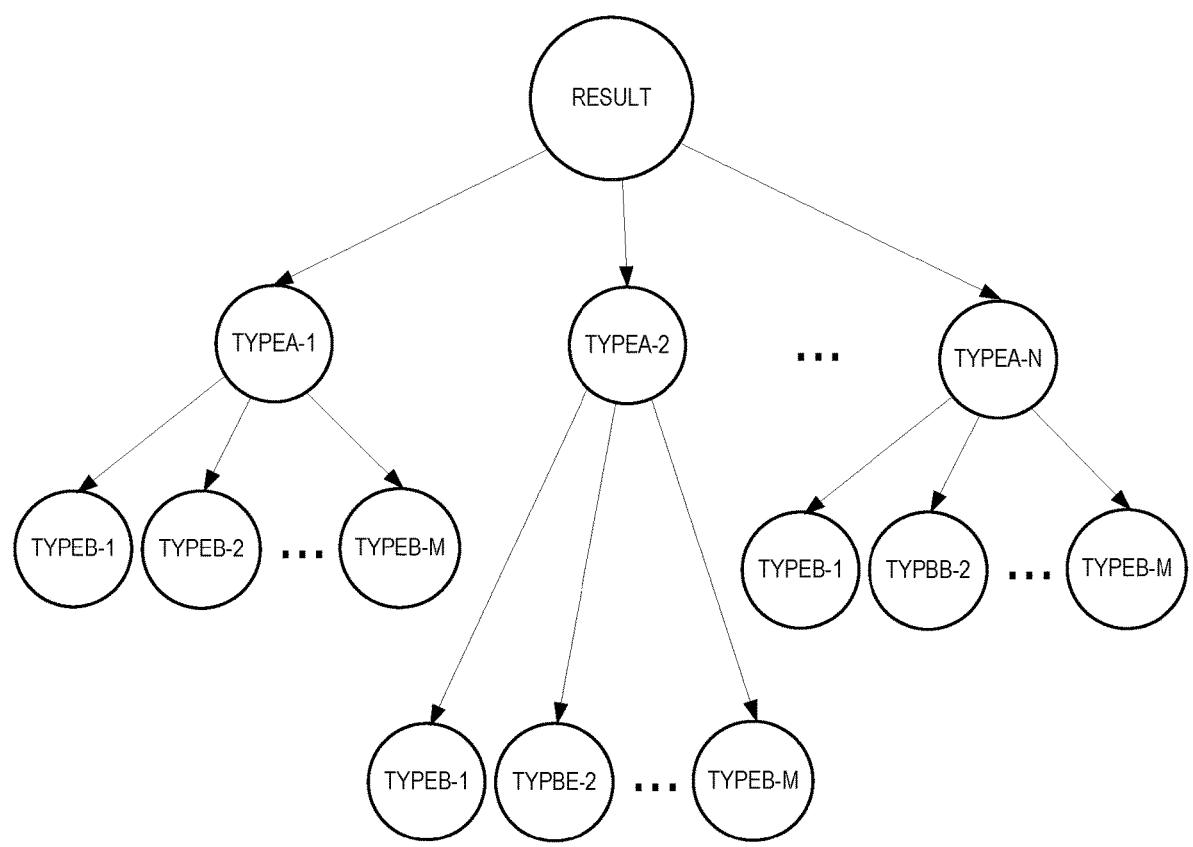
FIG. 6 is a diagram illustrating a tree representation of a result to the example query operation of FIG. 5 according to an embodiment.

FIG. 6 is a diagram illustrating tree representation 602 of the result to the example query operation of FIG. 5 according to an embodiment. As shown, the response includes N instances of type TYPEA and each TYPEA instance includes M instances of type TYPEB.

Figure 7:
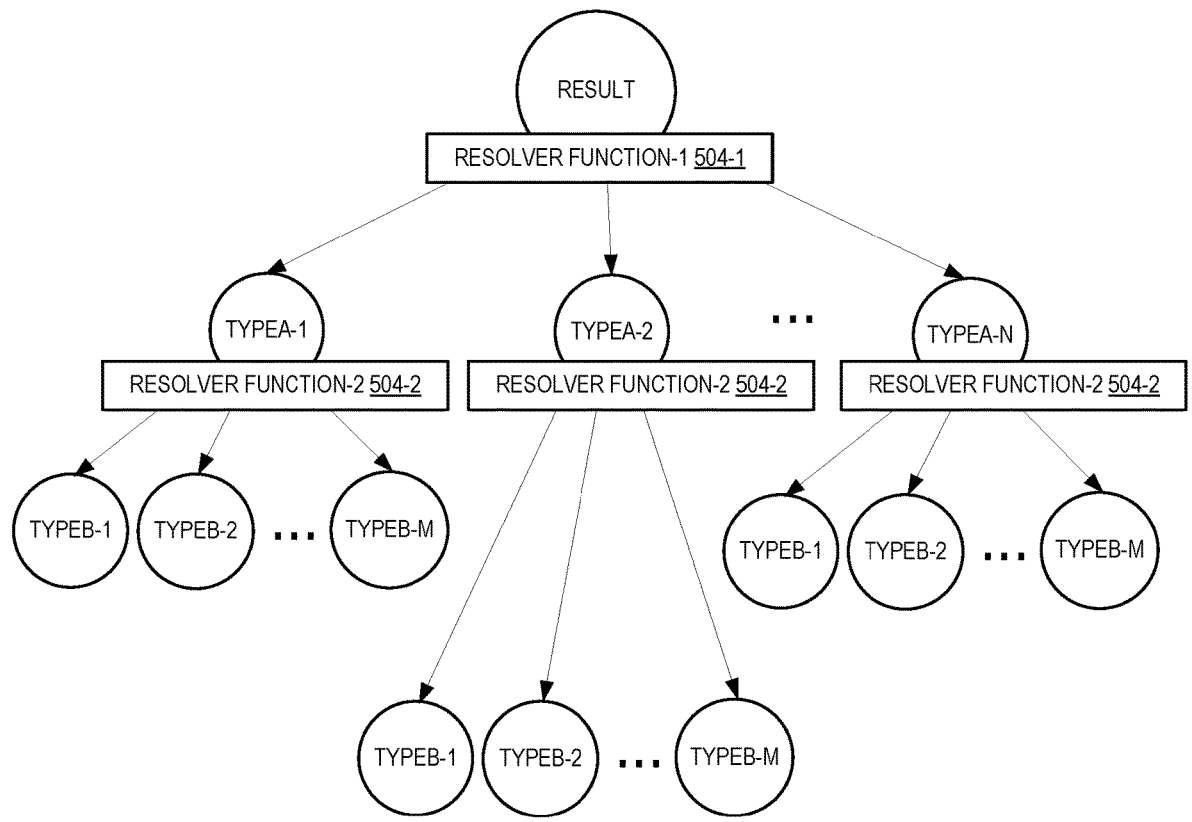
FIG. 7 is a diagram illustrating a tree representation of resolver function invocations involved in generating the result to the example query operation of FIG. 5 according to an embodiment.

FIG. 7 is a diagram illustrating tree representation 702 of resolver function invocations involved in generating the result to the example query operation of FIG. 5 according to an embodiment. As shown, resolver function-1 504-1 is executed once and resolver function-2 504-2 is executed N times, once for each TYPEA instance returned by resolver function-1 504-1.

Figure 8:
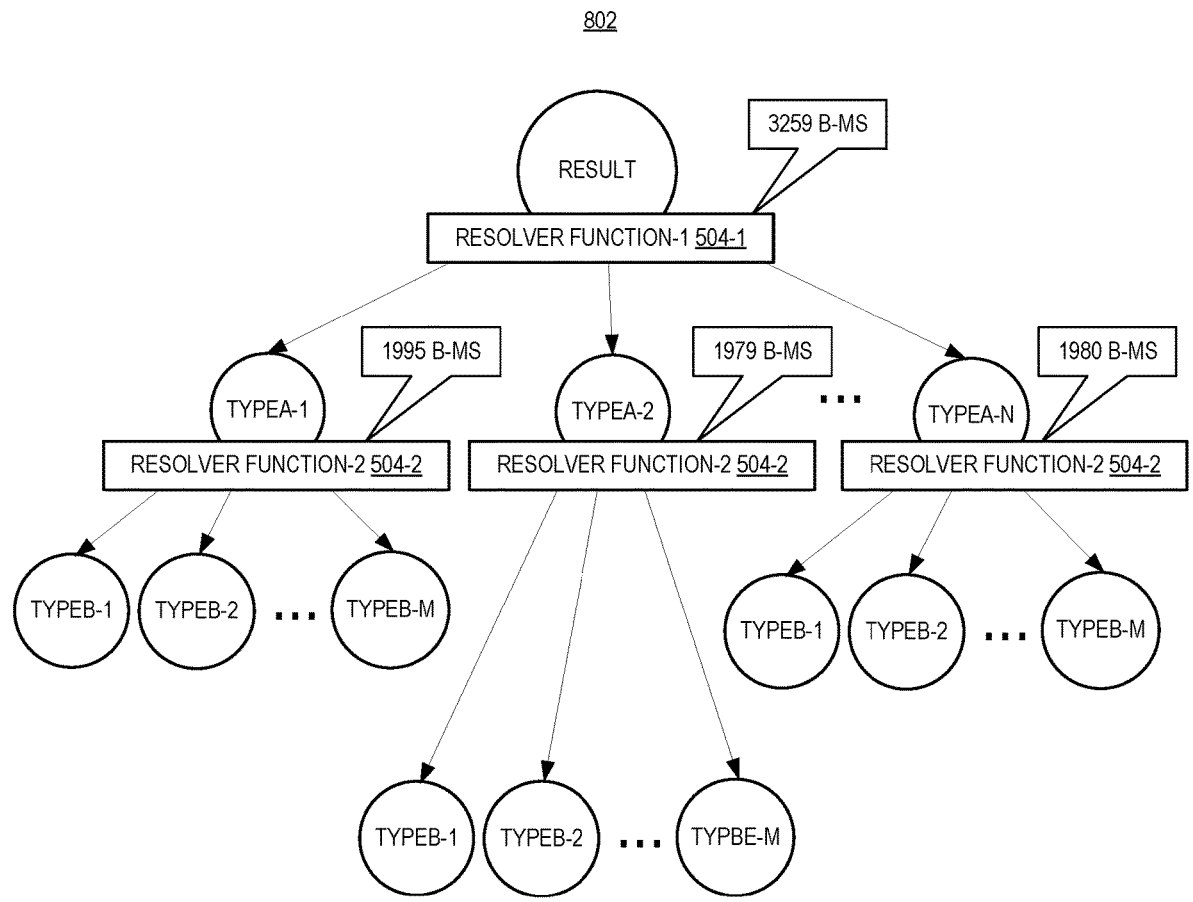
FIG. 8 is a diagram illustrating a tree representation of node request cost indexes calculated for the resolver function invocations involved in generating the result to the example query operation of FIG. 5 according to an embodiment.

FIG. 8 is a diagram illustrating tree representation 802 of per-node request cost index calculations for the resolver function invocations involving in generating the result to the example query operation of FIG. 5 according to an embodiment. For example, the node request cost index calculated for the execution of resolver function 504-1 is 3,259 bytes-milliseconds and the node request cost index calculated for the execution of resolver function-2 504-2 for the second TYPEA instance is 1,979 bytes-milliseconds. In an embodiment, the total request cost index for the query operation is calculated as the sum of the node request cost indexes calculated for the resolver function invocations.

Figure 9:
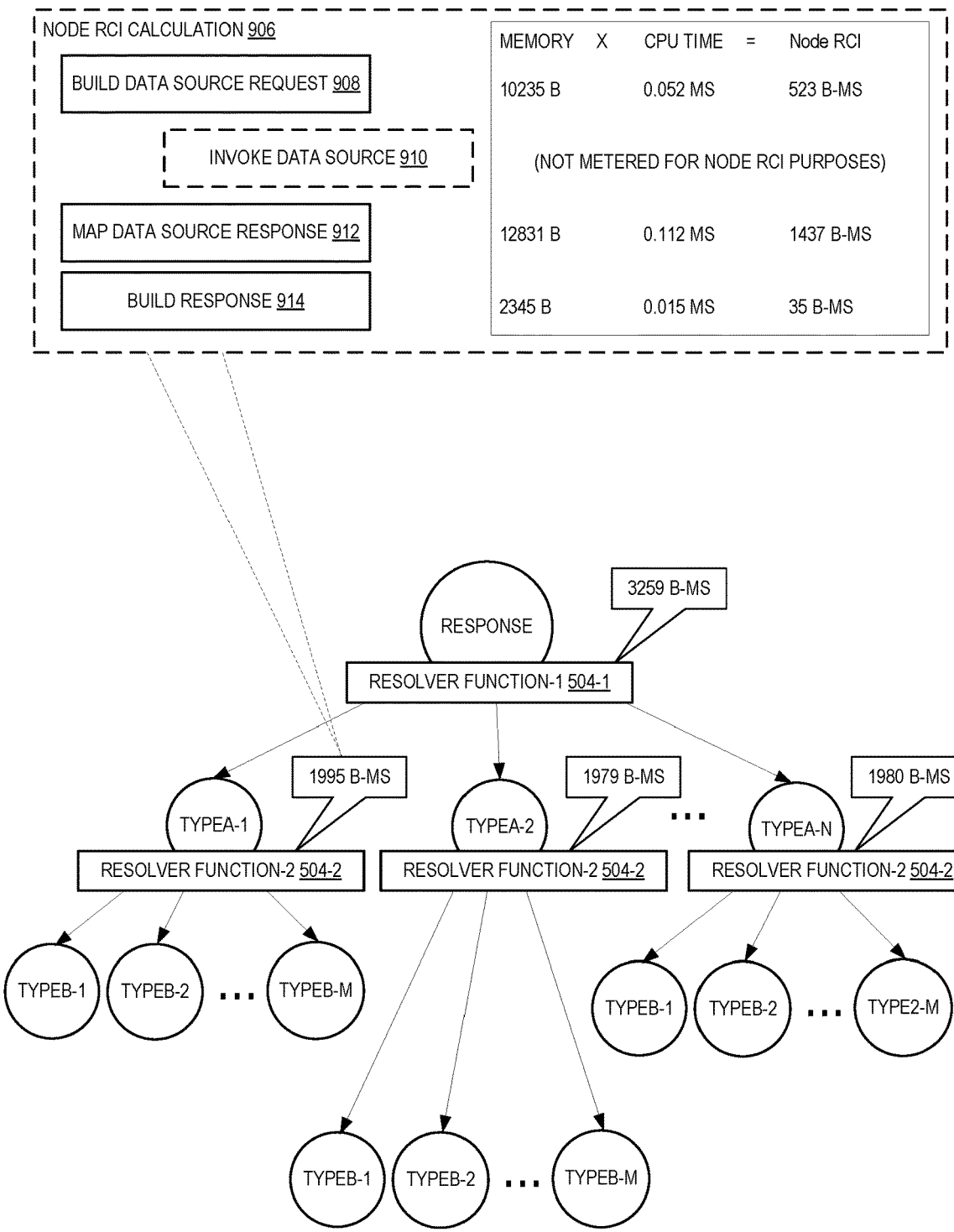
FIG. 9 is a diagram illustrating an example of node request cost index calculation for one resolver function invocation involved in generating the result to the example query operation of FIG. 5 according to an embodiment.

FIG. 9 is a diagram illustrating an example of calculating the node request cost index for one of the resolver function invocations involved in generating the result to the example query operation of FIG. 5 according to an embodiment. Example node request cost index calculation 906 involves measuring the amount of memory allocated and the processor time consumed by executing resolver function-2 504-2 for the first TYPEA instance (TYPEA-1). The instructions of resolver function-2 504-2 are programmed or configured to build data source request 908, invoke data source 910, map data source response 912, and build response 914. For example, build data source request 908 can prepare a request of a data source to fetch data for field FIELD4 of instance TYPEA-1. Preparing the request can involve serializing data objects to a data serialization format such as JSON, XML, or the like. Invoke data source 910 can send the prepared response to the data source and receive a response from the data source. Map data source response 912 can map the response received from the data source to data objects. For example, mapping the data source response can involve deserializing data fetched from the data source from a data serialization format such as JSON, XML, or the like into data objects. Build response 914 can involve formatting the deserialized data objects according to the API query language grammar for inclusion as part of the operation result. Calculation 906 involves measuring the amount of memory allocated and processor time consumed execution operations 908, 912, and 914 but not operation 910 (invoke data source) which is not metered for node request cost index purposes. Invoked data source 910 might not be metered for node request cost index calculation 906 because it mostly involves lower-level network I/O operations or standard API operations such as sending the request to the data source and receiving the response from the data source that are not part of the customized logic of resolver function-2 504-2 that is programmed or configured by an application developer. The total node request cost index then is calculated as the sum of the request cost indexes calculated for the metered operations 908, 912, and 914.

Figure 10:
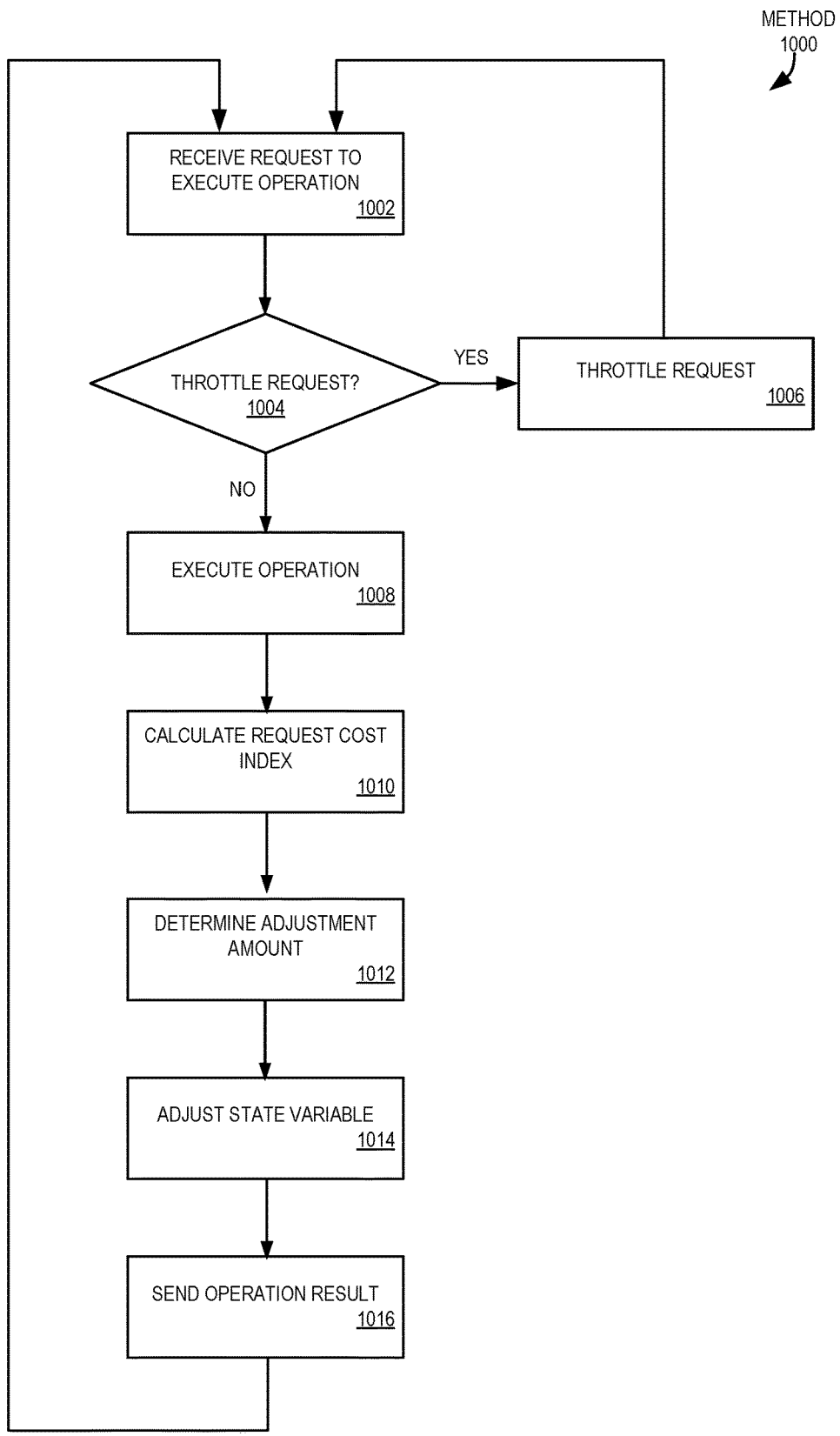
FIG. 10 is a flow diagram illustrating operations of a method for calculating and using a request cost index for throttling of requests to execute operations in a provider network according to an embodiment according to some embodiments.
Figure 11:
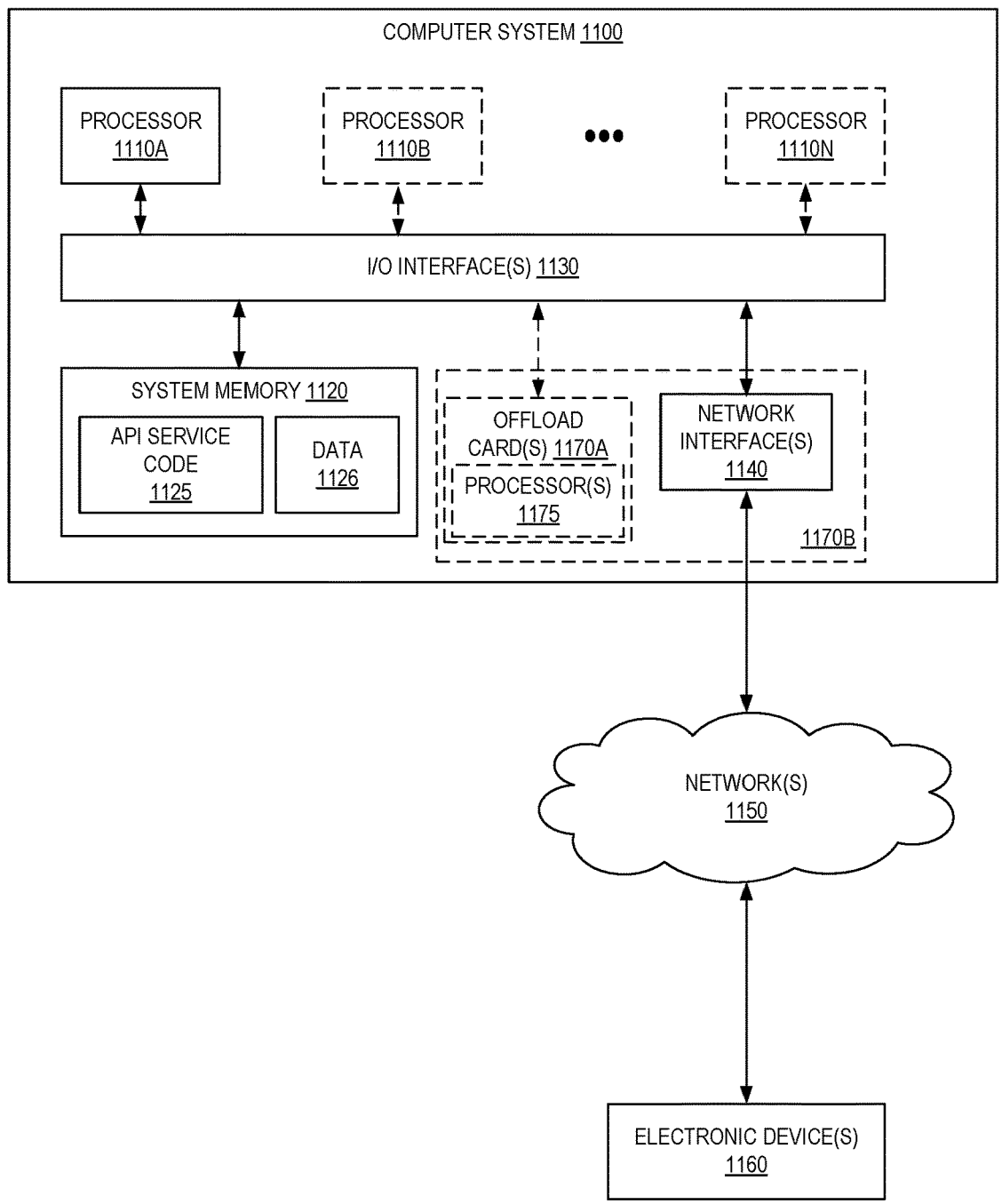
FIG. 11 is a block diagram illustrating an example computer system that can be used in some embodiments.

FIG. 10 is a flow diagram illustrating steps of a method for calculating and using a request cost index for throttling of requests to execute operations in a provider network according to an embodiment according to some embodiments. The steps of method 1000 can be performed, for example, by API service 104 of FIG. 1 executing on or otherwise using the features of computer system 1100 for purposes of illustration. It is appreciated that method 1000 can be altered to modify the order of steps and to include additional steps.

In step 1002, gateway service 1116 receives a request to execute an operation. The request can be a GraphQL request or other API query language request and the operation can be a GraphQL query, mutation, or subscription or other API query language operation. The request can be sent by client device 126, either in the arrangement shown in FIG. 1 where device 126 is external to provider network 100 or the arrangement shown in FIG. 2 where device 126 is within provider network 100.

In step 1004, rate limiter 118 determines if the request should be throttled. The throttling determination is made according to a request rate limiting algorithm. For example, the request rate limiting algorithm can be a token bucket algorithm. Rate limiter 118 determines whether to throttle the request by accessing rate limit state variable 120. Rate limit state variable 120 meters the request for throttling purposes. For example, rate limit state variable 120 can meter requests associated with a particular user account where the request received in step 1002 is associated with the particular user account. As another example, rate limit state variable 120 can meter requests of a particular application API supported by API service 104 where the request received in step 1002 is to access the particular application API. If the token bucket algorithm is used, then state variable 120 counts a number of tokens in a token bucket. Rate limiter 118 can determine to throttle the request if the number of tokens in the token bucket is zero or negative. On the other hand, if the number of tokens in the token bucket is positive, then rate limiter 118 can allow the request to be processed.

In step 1006, if rate limiter 118 determines to throttle the request, then gateway service 116 throttles the request. Throttling the request can include placing the request in a wait or holding queue where it can be processed at a later time or returning a response to the request that indicates that the request is throttled. For example, a HTTP response with status code 429 "Too Many Requests" can be sent by gateway service 116 to client device 126. In any case, the request is not immediately processed.

In step 1008, if rate limiter 118 determines to process the request, then the requested operation is executed by execution service 106. Executing the requested operation can include generating an abstract syntax tree representation of the operation. The tree representation encompasses node(s) corresponding to field(s) of the requested operation. The field(s) are resolved by executing resolver function(s). A resolver function, when executed, can fetch data from one or more data sources 102. Execution of the requested operation yields an operation result. The operation result can conform to API query language format. For example, if the request is a GraphQL request, then the operation result can be a GraphQL result of executing the requested GraphQL operation.

In step 1010, execution service 106 calculates a request cost index of executing the requested operation. The request cost index reflects an amount of computing resources of execution service 106 utilized by the requested operation. The computing resources can include memory and processor resources of execution service 106. In an embodiment, the request cost index is calculated as an amount of memory allocated from executing the requested operation multiplied by the processor time spent by execution service 106 executing the requested operation. The request cost index can be calculated based on a set of one or more node request cost indexes reflecting a set of one or more amounts of computing resources of execution service 106 utilized by executing a set of one or more resolver functions invoked to resolve one or more field instances of the requested operation to result data. In an embodiment, the set of node request cost indexes does not reflect computing resources utilized by fetching data from data sources. In an embodiment, execution service 106 calculates the request cost index based on determining an amount of memory allocated by executing the requested operation. In an embodiment, execution service 106 calculates the request cost index based on determining an amount of processor time spent executing the requested operation. In an embodiment, execution service 106 calculates the request cost index based on determining an elapsed time spent by execution service 106 executing the requested operation. In an embodiment, the elapsed time does not include elapsed time spent invoking a data source including time spent waiting for a request to be transmitted to a data source time spent waiting for a response to be received from the data source. In an embodiment, a node request cost index reflects an amount of computing resources utilized executing a respective resolver function including serializing and deserializing data objects to and from a data serialization format (e.g., JSON, XML, etc.)

In step 1012, execution service 106 or request cost index throttling handler 122 of gateway service 116 determines a rate limit state variable adjustment amount based on request cost index calculated for the requested operation. For example, execution service 106 can calculate the adjustment amount and include the adjustment amount in a HTTP response header sent to gateway service 116 where the HTTP response includes the operation result. Alternatively, execution service 106 can send the calculated request cost index to gateway service 116 in the response header and the adjustment amount can be calculated at the gateway service 116 based on the request cost index received in the response header. In either case, in an embodiment, the adjustment amount is determination such that the greater the request cost index exceeds a fair request cost index, the greater the adjustment amount. For example, where a token bucket algorithm is used, the adjustment amount can be a number of tokens to deduct from a token bucket where the number of tokens to deduct is proportional to the request cost index above the fair request cost index.

In step 1014, request cost index throttling handler 122 adjusts state variable 120 by the adjustment amount. For example, if a token bucket algorithm is used, then a number of tokens equal to the adjustment amount is deducted from the token bucket. In an embodiment, state variable 120 is adjusted by the adjustment amount only if the current compute load on execution service 106 is above a threshold. For example, the adjustment amount can be determined to be zero in step 1012 regardless of the request cost index calculated in step 1010 if the current compute load on one or more computing devices of execution service 106 is below a threshold average CPU utilization (e.g., 80%). However, if there is currently a large compute load on execution service 106 (e.g., above 80% average CPU utilization), then a positive adjustment amount can be determined and used to adjust state variable 120.

In step 1016, the operation result is returned to client device 126. Method 1000 can be repeated for different requests. If state variable 120 was adjusted in step 1014, then subsequent requests metered by state variable 120 can be throttled in step 1006. For example, subsequent requests can be throttled while the token bucket balance remains negative or at zero. When the balance becomes positive again, then subsequent requests metered by state variable 120 might no longer be throttled.

A system that implements a portion or all the techniques described herein can include a general-purpose computer system. In the illustrated embodiment, the computer system 1000 includes one or more processors 1010 coupled to system memory 1020 via input/output (I/O) interface 1030. System 1000 further includes network interface 1040 coupled to I/O interface 1030. While FIG. 10 shows computer system 1000 as a single computing device, in various embodiments computer system 1000 can include one computing device or any number of computing devices configured to work together as single computer system 1000 as in a distributed, parallel, or clustered computing system arrangement.

Computer system 1000 can be a uniprocessor system including one processor 1010, or a multiprocessor system including several processors 1010 (e.g., two, four, eight, or another suitable number). Processor(s) 1010 can be any suitable processor(s) capable of executing instructions. For example, in various embodiments, processor(s) 1010 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 1010 can commonly, but not necessarily, implement the same ISA.

System memory 1020 can store instructions and data accessible by the processor(s) 1010. In various embodiments, system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as API Service code 1025 (e.g., executable to implement, in whole or in part, the API Service 104) and data 1026.

In some embodiments, I/O interface 1030 can be configured to coordinate I/O traffic between processor(s) 1010, system memory 1020, and any peripheral devices in the device, including network interface 1040 or other peripheral interfaces (not shown). In some embodiments, I/O interface 1030 can perform any necessary protocol, timing, or other data transformations to convert data signals from one component (e.g., system memory 1020) into a format suitable for use by another component (e.g., processor(s) 1010). In some embodiments, I/O interface 1030 can include support for devices attached through various types of peripheral buses, such as a variant of the PERIPHERAL COMPONENT INTERCONNECT (PCI) bus standard or the UNIVERSAL SERIAL BUS (USB) standard, for example. In some embodiments, the function of I/O interface 1030 can be split into two or more separate components, such as a north bridge and a south bridge, for example. Also, in some embodiments, some or all of the functionality of I/O interface 1030, such as an interface to system memory 1020, can be incorporated directly into processor 1010.

Network interface 1040 can be configured to allow data to be exchanged between computer system 1000 and other devices 1060 attached to network(s) 1050, such as other computer systems or devices as illustrated in FIG. 1, for example. In various embodiments, network interface 1040 can support communication via any suitable wired or wireless general data networks, such as types of Ethernet network, for example. Additionally, network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, computer system 1000 includes one or more offload cards 1070A or 1070B (including one or more processors 1075, and possibly including one or more network interfaces 1040) that are connected using I/O interface 1030 (e.g., a bus implementing a version of the PERIPHERAL COMPONENT INTERCONNECT—EXPRESS (PCI-E) standard, or another interconnect such as a QUICKPATH INTERCONNECT (QPI) or ULTRAPATH INTERCONNECT (UPI)). For example, in some embodiments computer system 1000 can act as a host electronic device (e.g., operating as part of a hardware virtualization service) that hosts compute resources such as compute instances, and one or more offload cards 1070A or 1070B execute a virtualization manager that can manage compute instances that execute on the host electronic device. As an example, in some embodiments offload card(s) 1070A or 1070B can perform compute instance management operations, such as pausing or un-pausing compute instances, launching or terminating compute instances, performing memory transfer/copying operations, etc. These management operations can, in some embodiments, be performed by offload card(s) 1070A or 1070B in coordination with a hypervisor (e.g., upon a request from a hypervisor) that is executed by other processors 1010A-1010N of computer system 1000. However, in some embodiments the virtualization manager implemented by offload card(s) 1070A or 1070B can accommodate requests from other entities (e.g., from compute instances themselves), and cannot coordinate with (or service) any separate hypervisor.

In some embodiments, system memory 1020 can be one embodiment of a computer-accessible medium configured to store program instructions and data as described above. However, in other embodiments, program instructions or data can be received, sent, or stored upon different types of computer-accessible media. Generally speaking, a computer-accessible medium can include any non-transitory storage media or memory media such as magnetic or optical media, e.g., disk or DVD/CD coupled to computer system 1000 via I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of computer system 1000 as system memory 1020 or another type of memory. Further, a computer-accessible medium can include transmission media or signals such as electrical, electromagnetic, or digital signals, conveyed via a communication medium such as a network or a wireless link, such as can be implemented via network interface 1040.

Extensions, Alternatives, and Terminology

In the foregoing detailed description, reference is made to embodiments, examples of which are illustrated in the accompanying drawings. Numerous specific details are set forth to provide a thorough understanding of the embodiments. However, it is apparent that some embodiments can be practiced without these specific details. In other instances, well-known elements, features, acts, or operations have not been described in detail so as not to unnecessarily obscure the embodiments.

Bracketed text and blocks with dashed borders (e.g., large dashes, small dashes, dot-dash, or dots) are used herein to illustrate optional aspects that add to some embodiments. However, such notation should not be taken to mean that these are the only options or the only optional aspects, or that blocks with solid borders are not optional in certain embodiments.

Reference numerals with suffix letters (e.g., 114-1 . . . 114-N) are used to indicate merely that there can be one or multiple instances of the referenced element, feature, act, or operation, and when there are multiple instances, each does not need to be identical but can instead share some general traits or act in common ways. The particular suffixes used are not meant to imply that a particular amount of the element, feature, act, or operation exists unless specifically indicated to the contrary. Thus, two elements, features, acts, or operations using the same or different suffix letters might or might not have the same number of instances in various embodiments.

Unless the context clearly indicates otherwise, the term "or" is used in the foregoing specification and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method for throttling graph query language requests in a multi-tenant provider network, the method comprising:

receiving, by a gateway service in the multi-tenant provider network, a first graph query language request, the first graph query language request sent by a client computing device, the first graph query language request specifying a first graph query language operation to be executed, the first graph query language operation comprising a set of one or more fields to be resolved to data, the set of one or more fields having a field cardinality;

determining, by the gateway service, not to throttle the first graph query language request based on a token bucket;

executing, by an execution service in the provider network, the first graph query language operation to yield an operation result, wherein executing the first graph query language operation comprises executing a set of one or more resolver functions associated with the first graph query language operation to resolve the set of one or more fields to data, wherein executing the set of one or more resolver functions encompasses a number of resolver function invocations, and wherein the number of resolver function invocations is greater than the field cardinality of the set of one or more fields of the first graph query language operation;

determining, by the execution service, a respective request computing resource cost index for each resolver function of the set of one or more resolver functions, the respective request computing resource cost index reflecting an amount of computing resources utilized by the execution service executing the resolver function;

calculating, by the execution service, an overall request computing resource cost index reflecting an amount of computing resources utilized by the execution service executing the first graph query language operation, the overall request computing resource cost index calculated based on the respective request computing resource cost index determined for each resolver function of the set of one or more resolver functions;

determining a number of tokens to deduct from the token bucket based on the overall request computing resource cost index;

deducting, by the gateway service, the number of tokens from the token bucket;

sending, by the gateway service, the operation result, the operation result received by the client computing device;

after the deducting, receiving, by the gateway service, a second graph query language request, the second graph query language request sent by the client computing device, the second graph query language request specifying a second graph query language operation to be executed; and determining, by the gateway service, whether to throttle the second graph query language request based on the token bucket.

2. The method of claim 1, further comprising:

generating an abstract syntax tree, the abstract syntax tree comprising a set of one or more nodes, the set of nodes corresponding to the set of one or more fields of the first graph query language operation to be resolved to data.

3. The method of claim 1, wherein determining the number of tokens to deduct from the token bucket is based on a fair request computing resource cost index.

4. A method for throttling graph query language requests in a multi-tenant provider network, the method comprising:

receiving, by an application programming interface (API) service in the multi-tenant provider network, a graph query language request to execute an operation, the operation of the graph query language request comprising a set of one or more fields to be resolved to data, the set of one or more fields having a field cardinality;

determining, by the API service, to process the graph query language request based on a request rate limiting algorithm;

executing, by the API service, the operation to yield an operation result, wherein executing the operation comprises the API service executing a set of one or more resolver functions associated with the operation to resolve the set of one or more fields of the operation of the graph query language request to data, wherein the executing the set of one or more resolver functions encompasses a number of resolver function invocations, and wherein the number of resolver function invocations is greater than the field cardinality of the set of one or more fields of the operation of the graph query language request;

determining, by the API service, a respective request computing resource cost index for each resolver function of the set of one or more resolver functions, the respective request computing resource cost index reflecting an amount of computing resources utilized by the API service executing the resolver function;

calculating, by the API service, an overall request computing resource cost index reflecting an amount of computing resources utilized by the API service executing the operation, the overall request computing resource cost index calculated based on the respective request computing resource cost index determined for each resolver function of the set of one or more resolver functions;

determining, by the API service, an adjustment amount for a state variable of the request rate limiting algorithm based on the overall request computing resource cost index;

adjusting, by the API service, the state variable of the request rate limiting algorithm by the adjustment amount; and sending, by the API service, the operation result.

5. The method of claim 4, further comprising:

generating an abstract syntax tree, the abstract syntax tree comprising a set of one or more nodes, the set of nodes corresponding to the set of one or more fields of the operation of the graph query language request.

6. The method of claim 4, further comprising:

determining a respective amount of memory allocated by the API service executing each resolver function of the set of one or more resolver functions; and wherein determining the respective request computing resource cost index for each resolver function of the set of one or more resolver functions is based on the respective amount of memory.

7. The method of claim 4, further comprising:

determining a respective processor time spent by the API service executing each resolver function of the set of one or more resolver functions; and wherein determining the respective request computing resource cost index for each resolver function of the set of one or more resolver functions is based on the respective processor time.

8. The method of claim 4, further comprising:

wherein determining the adjustment amount for the state variable of the request rate limiting algorithm based on the overall request computing resource cost index is based on determining a number of tokens to deduct from a token bucket based on the overall request computing resource cost index.

9. The method of claim 4, further comprising:

determining a respective amount of memory allocated by the API service executing each resolver function of the set of one or more resolver functions;

determining a respective processor time spent by the API service executing each resolver function of the set of one or more resolver functions; and determining the respective request computing resource cost index for each resolver function of the set of one or more resolver functions as the respective amount of memory allocated multiplied by the respective processor time.

10. The method of claim 4, further comprising:

determining that a compute load of an electronic device exceeds a threshold compute load; and wherein adjusting the state variable of the request rate limiting algorithm by the adjustment amount is based on the compute load of the electronic device exceeding the threshold compute load.

11. The method of claim 4, further comprising:

determining a respective elapsed time spent executing each resolver function of the set of one or more resolver functions; and wherein determining the respective request computing resource cost index for each resolver function of the set of one or more resolver functions is based on the respective elapsed time spent executing the resolver function.

12. The method of claim 4, further comprising:

determining a fair request computing resource cost index; and wherein determining the adjustment amount for the state variable of the request rate limiting algorithm based on the overall request computing resource cost index is further based on the fair request computing resource cost index.

13. The method of claim 4,
wherein executing the set of resolver functions comprises fetching a set of data from a set of one or more data sources; and
wherein determining the respective request computing resource cost index for each resolver function of the set of one or more resolver functions is based on excluding from the respective request computing resource cost index determination computing resources utilized fetching the set of data from the set of data sources.

14. The method of claim 4,
wherein executing the set of resolver functions comprises:
serializing a first set of one or more data objects to produce a first set of one or more serialized data objects;
sending the first set of serialized data objects to a set of one or more data sources;
receiving a second set of one or more serialized data objects from the set of data sources; and
deserializing the second set of serialized data objects; and
wherein determining the respective request computing resource cost index for each resolver function of the set of one or more resolver functions is based on excluding from the respective request computing resource cost index determination computing resources utilized sending the first set of serialized data objects and computing resources utilized receiving the second set of one or more serialized data objects.

15. A system for throttling graph query language requests in a multi-tenant provider network, the system comprising:
a first one or more electronic devices to implement a gateway service in the multi-tenant provider network, the gateway service comprising instructions which when executed cause the gateway service to:
receive a graph query language request to execute an operation comprising a set of one or more fields having a field cardinality,
determine to process the graph query language request based on a request rate limiting algorithm,
send the operation to an execution service in the multi-tenant provider network,
adjust a state variable of the request rate limiting algorithm based on an overall request computing resource cost index that reflects an amount of computing resources utilized by the execution service to execute the operation, and
send an operation result of executing the operation; and
a second one or more electronic devices to implement the execution service in the multi-tenant provider network, the execution service comprising instructions which when executed cause the execution service to:
execute a set of one or more resolver functions associated with the operation to resolve the set of one or more fields of the operation of the graph query language request to data, wherein a number of resolver function invocations is greater than the field cardinality of the set of one or more fields of the operation of the graph query language request,
determine a respective request computing resource cost index for each resolver function of the set of one or more resolver functions reflecting an amount of computing resources utilized by the execution service executing the resolver function;
calculate the overall request computing resource cost index based on the respective request cost index for each resolver function of the set of one or more resolver functions, and
provide the request computing resource cost index to the gateway service.

16. The system of claim 15, further comprising:
instructions which when executed cause the execution service to:
generate an abstract syntax tree, the abstract syntax tree to comprise a set of one or more nodes, the set of nodes to correspond to the set of one or more fields of the operation of the graph query language request to be resolved to data.

17. The system of claim 15, further comprising:
instructions which when executed cause the execution service to:
determine a respective amount of memory allocated by the execution service to execute each resolver function of the set of one or more resolver functions; and
determine the respective request computing resource cost index for each resolver function of the set of one or more resolver functions based on the respective amount of memory allocated.

18. The system of claim 15, further comprising:
instructions which when executed cause the execution service to:
determine a respective processor time spent by the execution service to execute each resolver function of the set of one or more resolver functions; and
determine the respective request computing resource cost index based on the respective processor time.

19. The system of claim 15, further comprising:
instructions which when executed cause the execution service to:
determine a number of tokens to deduct from a token bucket based on the overall request computing resource cost index; and
adjust the state variable of the request rate limiting algorithm based on the number of tokens to deduct.

20. The system of claim 15, further comprising:
instructions which when executed cause the execution service to:
determine the respective request computing resource cost index for each resolver function of the set of one or more resolver functions as a respective amount of memory allocated by the execution service to execute the resolver function multiplied by a respective processor time spent by the execution service to execute the resolver function.

* * * * *